US012811638B2

(12) United States Patent
Ma et al.

(10) Patent No.: US 12,811,638 B2
(45) Date of Patent: Nov. 24, 2026

(54) ANTENNA SWITCHING INDICATION FOR UPLINK TRANSMISSION

(71) Applicant: QUALCOMM Incorporated, San Diego, CA (US)

(72) Inventors: Liangping Ma, San Diego, CA (US); Xiao Feng Wang, San Diego, CA (US); Ayan Sengupta, San Diego, CA (US); Alberto Rico Alvarino, San Diego, CA (US); Peter Gaal, San Diego, CA (US); Juan Montojo, San Diego, CA (US); Lorenzo Casaccia, Barcelona (ES); Bharat Shrestha, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 18/262,885

(22) PCT Filed: Jan. 5, 2022

(86) PCT No.: PCT/US2022/070035
§ 371 (c)(1),
(2) Date: Jul. 25, 2023

(87) PCT Pub. No.: WO2022/212961
PCT Pub. Date: Oct. 6, 2022

(65) Prior Publication Data

US 2024/0120976 A1 Apr. 11, 2024

(30) Foreign Application Priority Data

Apr. 1, 2021 (EP) .................................... 21382278

(51) Int. Cl.
*H04B 7/06* (2006.01)
*H04L 5/00* (2006.01)
(Continued)

(52) U.S. Cl.
CPC ......... *H04B 7/0608* (2013.01); *H04L 5/0051* (2013.01); *H04W 72/231* (2023.01); *H04W 74/0833* (2013.01)

(58) Field of Classification Search
CPC .............. H04B 7/0608; H04W 72/231; H04W 74/0833; H04L 5/0051
(Continued)

(56) References Cited

U.S. PATENT DOCUMENTS

2019/0254076 A1 8/2019 Siomina et al.
2020/0350970 A1 11/2020 Liu et al.
(Continued)

FOREIGN PATENT DOCUMENTS

AU 2018367796 A1 2/2020
EP 3490166 A1 5/2019

OTHER PUBLICATIONS

European Search Report—EP21382278—Search Authority—Munich—Dec. 23, 2021.
(Continued)

*Primary Examiner* — Faisal Choudhury
(74) *Attorney, Agent, or Firm* — QUALCOMM Incorporated

(57) ABSTRACT

Various aspects of the present disclosure generally relate to wireless communication. In some aspects, a user equipment (UE) and a network node may determine a configuration that indicates an antenna switching point associated with an uplink communication configured for multiple repetitions.
(Continued)

The UE may transmit one or more repetitions of the uplink communication using a first transmit antenna prior to the antenna switching point. The UE may transmit one or more repetitions of the uplink communication using a second transmit antenna after the antenna switching point. The network node may perform channel estimation for the uplink communication based at least in part on the configuration that indicates the antenna switching point. Numerous other aspects are described.

30 Claims, 12 Drawing Sheets

(51) Int. Cl.
*H04W 72/231* (2023.01)
*H04W 74/0833* (2024.01)

(58) Field of Classification Search
USPC .......................................................... 370/329
See application file for complete search history.

(56) References Cited

U.S. PATENT DOCUMENTS

2022/0191940 A1* 6/2022 MolavianJazi ...... H04B 17/328
2023/0093016 A1* 3/2023 Shi .......................... H04L 41/12 370/329
2023/0216632 A1* 7/2023 Go ........................ H04L 5/0048 370/329
2023/0300891 A1* 9/2023 Su ......................... H04L 5/0048 370/329
2024/0031011 A1* 1/2024 Zhu .................... H04B 7/18539
2024/0080086 A1* 3/2024 Nilsson ................ H04B 7/0874

OTHER PUBLICATIONS

International Search Report and Written Opinion—PCT/US2022/070035—ISA/EPO—Apr. 26, 2022.

* cited by examiner

ANTENNA SWITCHING INDICATION FOR UPLINK TRANSMISSION

CROSS-REFERENCE TO RELATED APPLICATIONS

This Patent Application is a 371 national stage of PCT Application No. PCT/US2022/070035 filed on Jan. 5, 2022, entitled "ANTENNA SWITCHING INDICATION FOR UPLINK TRANSMISSION," which claims priority to European Application No. 21382278.6, filed on Apr. 1, 2021, entitled "ANTENNA SWITCHING INDICATION FOR UPLINK TRANSMISSION." The disclosure of the prior Applications are considered part of and are hereby expressly incorporated by reference into this Patent Application.

FIELD OF THE DISCLOSURE

Aspects of the present disclosure generally relate to wireless communication and to techniques and apparatuses associated with an antenna switching indication for an uplink transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining a configuration that indicates an antenna switching point associated with an uplink communication configured for multiple repetitions; transmitting, to a network node, one or more repetitions of the uplink communication using a first transmit antenna prior to the antenna switching point; and transmitting, to the network node, one or more repetitions of the uplink communication using a second transmit antenna after the antenna switching point.

In some aspects, a method of wireless communication performed by a network node includes determining a configuration that indicates an antenna switching point associated with an uplink communication configured for multiple repetitions; receiving, from a UE, one or more repetitions of the uplink communication prior to the antenna switching point and one or more repetitions of the uplink communication after the antenna switching point; and performing channel estimation for the uplink communication based at least in part on the configuration that indicates the antenna switching point.

In some aspects, a UE for wireless communication includes a memory and one or more processors, coupled to the memory, configured to: determine a configuration that indicates an antenna switching point associated with an uplink communication configured for multiple repetitions; transmit, to a network node, one or more repetitions of the uplink communication using a first transmit antenna prior to the antenna switching point; and transmit, to the network node, one or more repetitions of the uplink communication using a second transmit antenna after the antenna switching point.

In some aspects, a network node for wireless communication includes a memory and one or more processors, coupled to the memory, configured to: determine a configuration that indicates an antenna switching point associated with an uplink communication configured for multiple repetitions; receive, from a UE, one or more repetitions of the uplink communication prior to the antenna switching point and one or more repetitions of the uplink communication after the antenna switching point; and perform channel estimation for the uplink communication based at least in part on the configuration that indicates the antenna switching point.

In some aspects, a non-transitory computer-readable medium storing a set of instructions for wireless communication includes one or more instructions that, when executed by one or more processors of a UE, cause the UE to: determine a configuration that indicates an antenna switching point associated with an uplink communication configured for multiple repetitions; transmit, to a network node, one or more repetitions of the uplink communication using a first transmit antenna prior to the antenna switching point; and transmit, to the network node, one or more repetitions of the uplink communication using a second transmit antenna after the antenna switching point.

In some aspects, a non-transitory computer-readable medium storing a set of instructions for wireless communication includes one or more instructions that, when executed by one or more processors of a network node, cause the network node to: determine a configuration that indicates an antenna switching point associated with an uplink communication configured for multiple repetitions; receive, from a UE, one or more repetitions of the uplink communication prior to the antenna switching point and one or more repetitions of the uplink communication after the antenna switching point; and perform channel estimation for the uplink communication based at least in part on the configuration that indicates the antenna switching point.

In some aspects, an apparatus for wireless communication includes means for determining a configuration that indicates an antenna switching point associated with an uplink communication configured for multiple repetitions; means for transmitting, to a network node, one or more repetitions of the uplink communication using a first transmit antenna prior to the antenna switching point; and means for transmitting, to the network node, one or more repetitions of the uplink communication using a second transmit antenna after the antenna switching point.

In some aspects, an apparatus for wireless communication includes means for determining a configuration that indicates an antenna switching point associated with an uplink communication configured for multiple repetitions; means for receiving, from a UE, one or more repetitions of the uplink communication prior to the antenna switching point and one or more repetitions of the uplink communication after the antenna switching point; and means for performing channel estimation for the uplink communication based at least in part on the configuration that indicates the antenna switching point.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
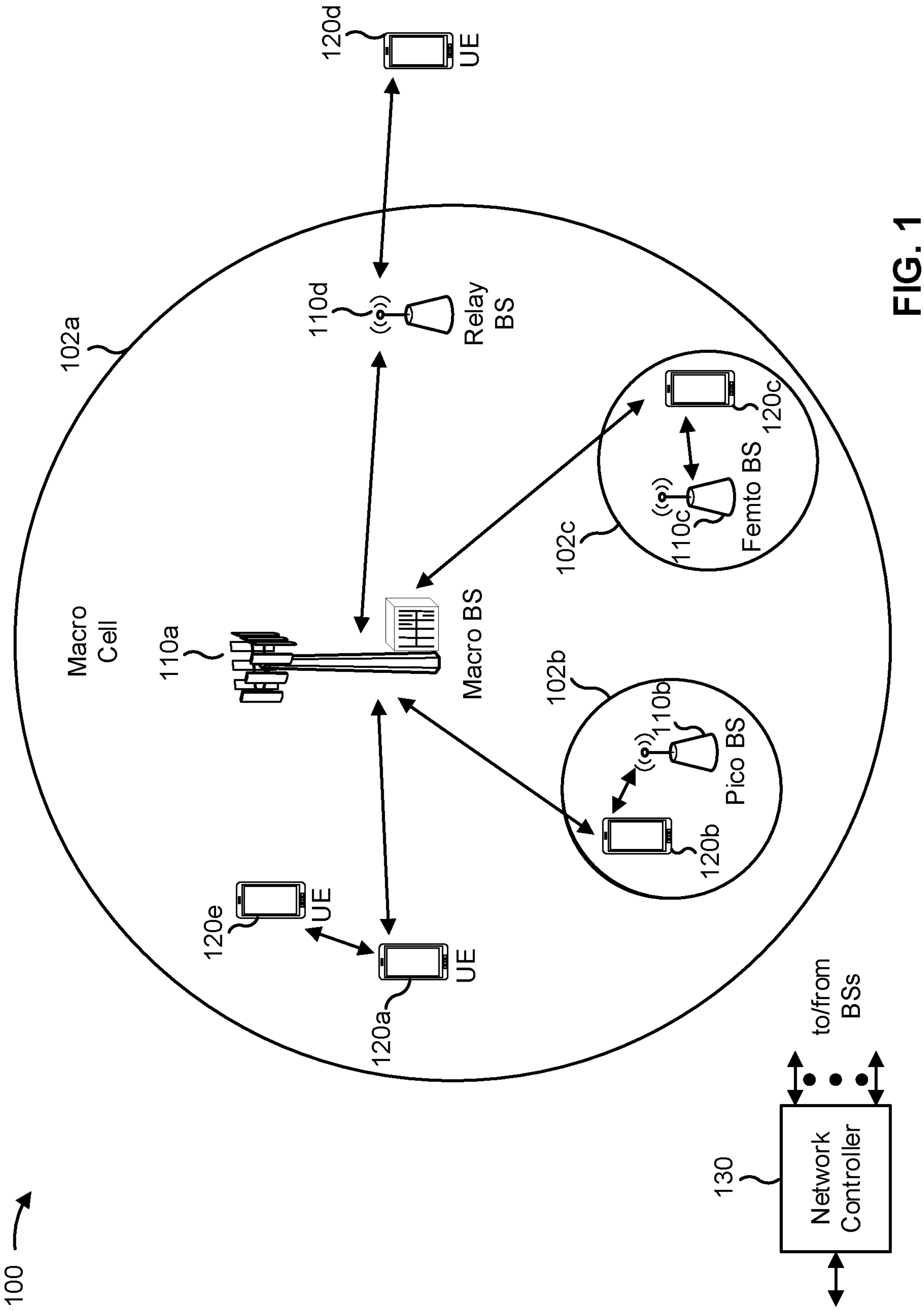
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
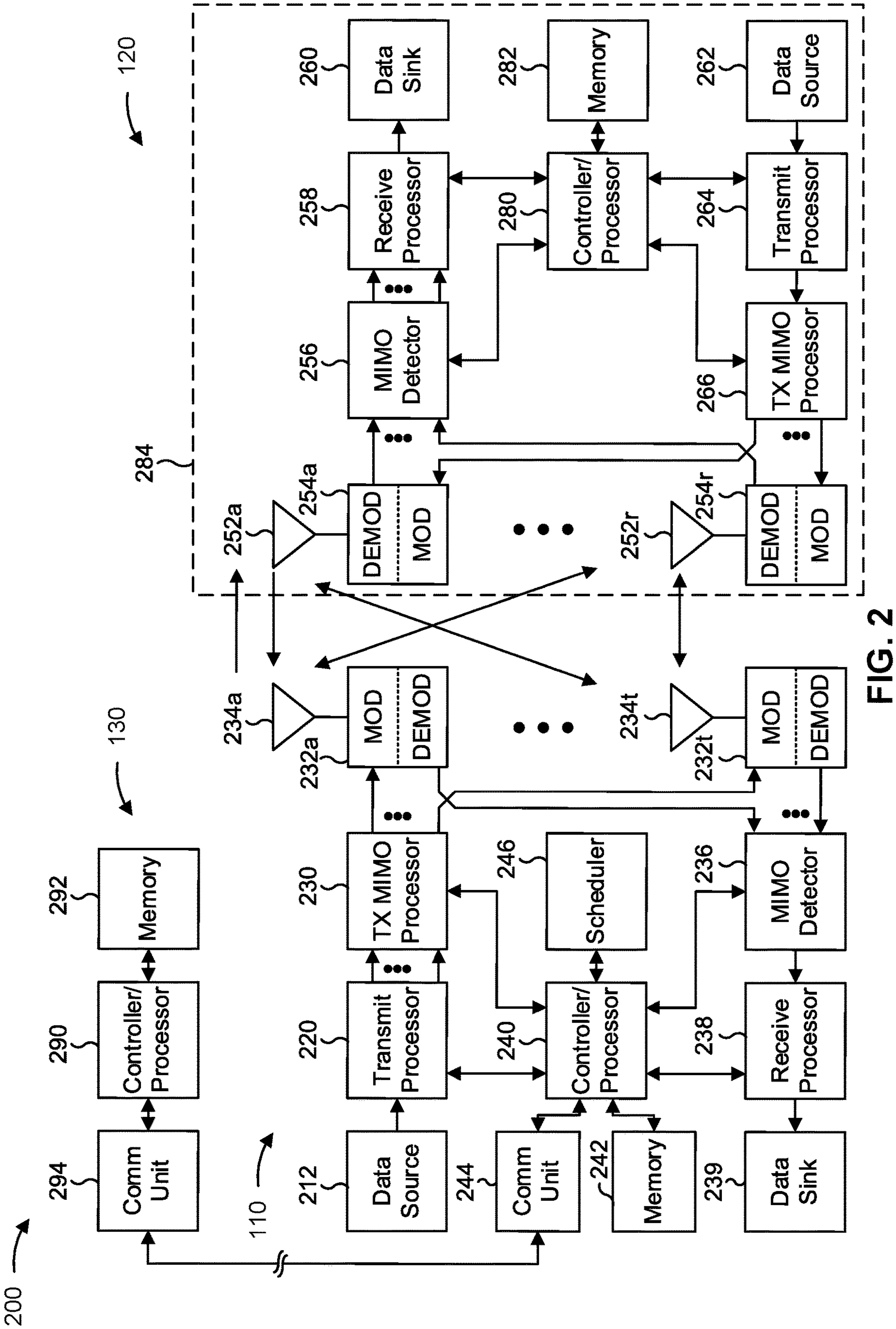
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRN)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators **254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., as described with reference to FIG. 5, FIGS. 6A-6B, FIG. 7, FIG. 8, and/or FIG. 9**).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., as described with reference to FIG. 5, FIGS. 6A-6B, FIG. 7, FIG. 8, and/or FIG. 9).

Controller/processor 240 of base station 110, controller/processor 280 of UE 120, and/or any other component(s) of FIG. 2 may perform one or more techniques associated with an antenna switching indication for an uplink transmission, as described in more detail elsewhere herein. In some aspects, a network node as described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE 120 includes means for determining a configuration that indicates an antenna switching point associated with an uplink communication configured for multiple repetitions; means for transmitting, to a network node, one or more repetitions of the uplink communication using a first transmit antenna prior to the antenna switching point; and/or means for transmitting, to the network node, one or more repetitions of the uplink communication using a second transmit antenna after the antenna switching point. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the network node includes means for determining a configuration that indicates an antenna switching point associated with an uplink communication configured for multiple repetitions; means for receiving, from the UE 120, one or more repetitions of the uplink communication prior to the antenna switching point and one or more repetitions of the uplink communication after the antenna switching point; and/or means for performing channel estimation for the uplink communication based at least in part on the configuration that indicates the antenna switching point. In some aspects, the means for the network node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
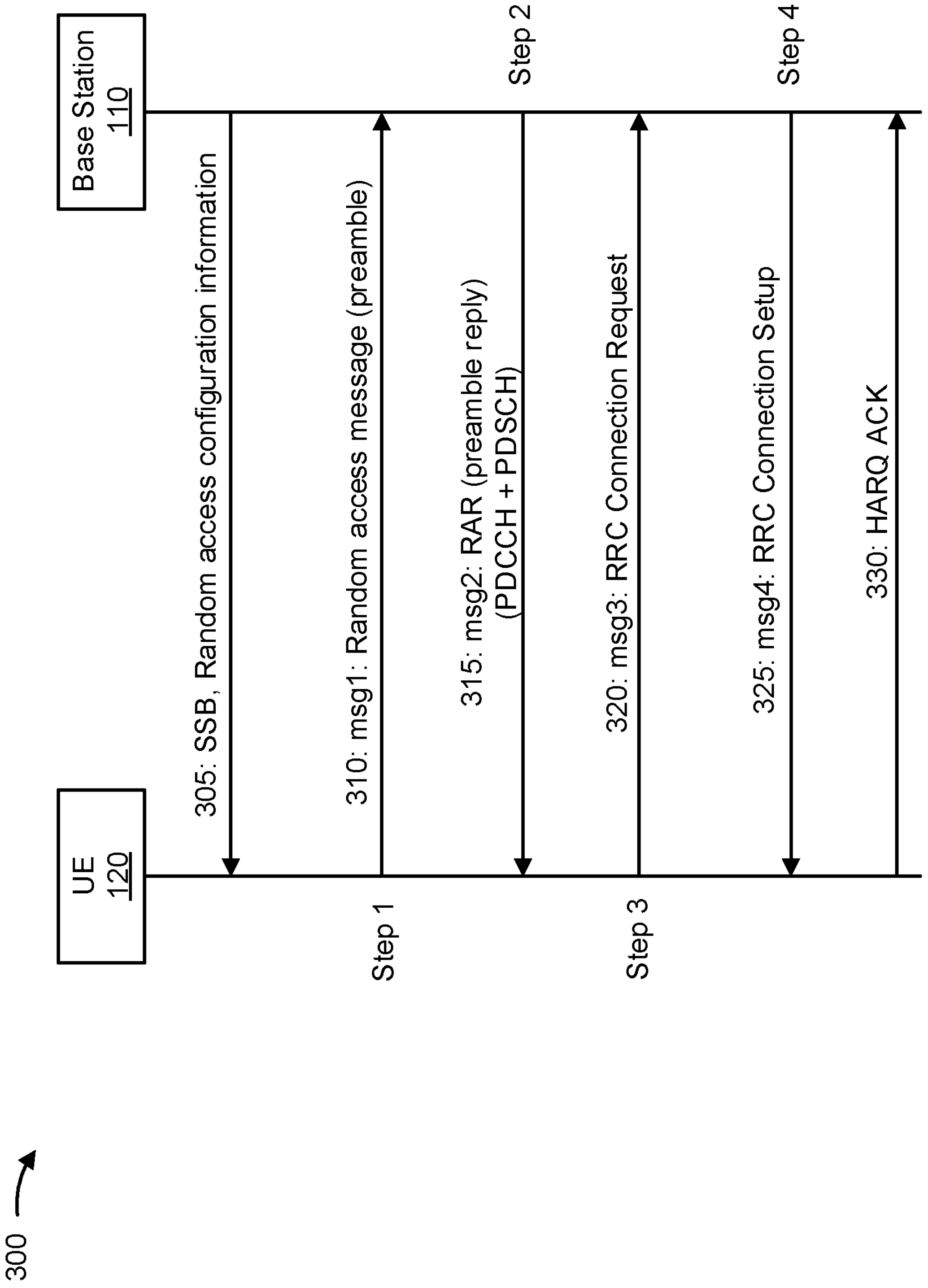
FIG. 3 is a diagram illustrating an example of a four-step random access channel (RACH) procedure, in accordance with the present disclosure.

FIG. 3 is a diagram illustrating an example of a four-step random access channel (RACH) procedure, in accordance with the present disclosure. As shown in FIG. 3, a base station 110 and a UE 120 may communicate with one another to perform the four-step RACH procedure.

As shown by reference number 305, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the four-step RACH procedure, such as one or more parameters for transmitting a random access message (RAM) and/or one or more parameters for receiving a random access response (RAR) as a reply to the RAM. For example, the random access configuration information may indicate one or more RACH occasions (ROs) that include time and frequency resources in which the UE 120 may transmit a RAM to initiate the four-step RACH procedure.

As shown by reference number 310, the UE 120 may transmit a RAM, which may include a preamble (sometimes referred to as a random access preamble, a physical RACH (PRACH) preamble, or a RAM preamble). The message that includes the preamble may be referred to as a message 1, msg1, MSG1, a first message, or an initial message in a four-step RACH procedure. The RAM may include a random access preamble identifier.

As shown by reference number 315, the base station 110 may transmit an RAR as a reply to the preamble. The message that includes the RAR may be referred to as message 2, msg2, MSG2, or a second message in a four-step RACH procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step RACH procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step RACH procedure, the base station 110 may transmit the PDSCH communication for the RAR, as scheduled by the PDCCH communication. The RAR may be included in a medium access control (MAC) protocol data unit (PDU) of the PDSCH communication.

As shown by reference number 320, the UE 120 may transmit an RRC connection request message. The RRC connection request message may be referred to as message 3, msg3, MSG3, or a third message of a four-step RACH procedure. In some aspects, the RRC connection request may include a UE identifier, uplink control information (UCI), and/or a physical uplink shared channel (PUSCH) communication (e.g., an RRC connection request).

As shown by reference number 325, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 330, if the UE 120 successfully receives the RRC connection setup message, the UE 120 may transmit a hybrid automatic repeat request (HARQ) acknowledgement (ACK).

As indicated above, FIG. 3 is provided as an example. Other examples may differ from what is described with regard to FIG. 3.

Figure 4:
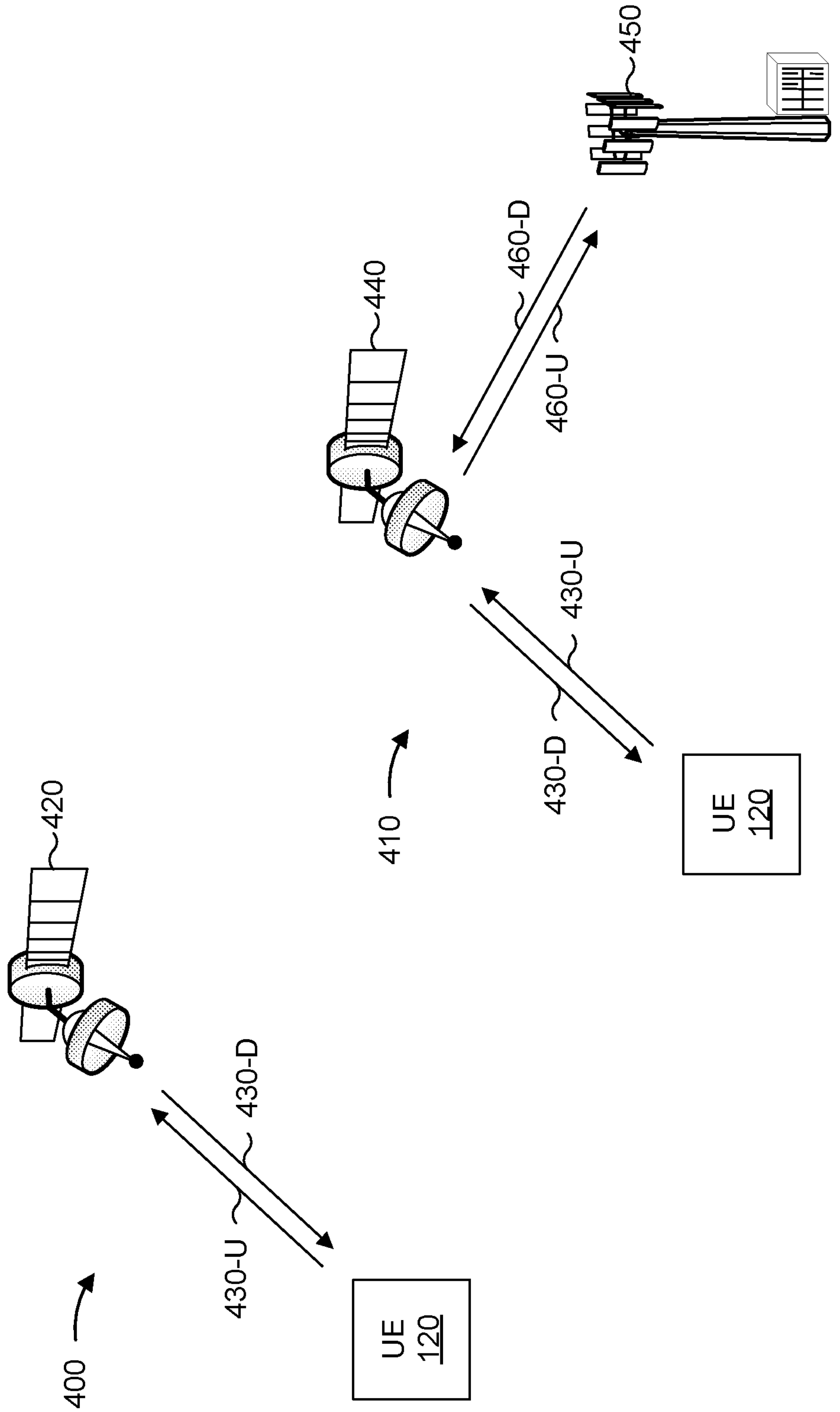
FIG. 4 is a diagram illustrating an example of a regenerative satellite deployment and an example of a transparent satellite deployment in a non-terrestrial network, in accordance with the present disclosure.

FIG. 4 is a diagram illustrating an example 400 of a regenerative satellite deployment and an example 410 of a transparent satellite deployment in a non-terrestrial network (NTN), in accordance with the present disclosure.

Example 400 shows a regenerative satellite deployment. In example 400, a UE 120 is served by a satellite 420 via a service link 430. For example, the satellite 420 may include a BS 110 (e.g., BS 110*a*) or a gNB. In some aspects, the satellite 420 may be referred to as a non-terrestrial base station, a regenerative repeater, and/or an on-board processing repeater, among other examples. In some aspects, the satellite 420 may demodulate an uplink radio frequency signal, and may modulate a baseband signal derived from the uplink radio signal to produce a downlink radio frequency transmission. The satellite 420 may transmit the downlink radio frequency signal on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may be a transparent satellite. The satellite 440 may relay a signal received from a gateway 450 via a feeder link 460. For example, the satellite 440 may receive a radio frequency transmission from the gateway 450 via the feeder link 460, and may relay the radio frequency transmission to the UE 120 via the service link 430 without demodulating the radio frequency transmission. Additionally, or alternatively, the satellite 440 may receive a radio frequency transmission from the UE 120 via the service link 430, and may relay the radio frequency transmission to the gateway 450 via the feeder link 460 without demodulating the radio frequency transmission. In some aspects, the satellite 440 may frequency convert radio frequency transmissions received on the service link 430 to a frequency of the radio frequency transmission on the feeder link 460 (or vice versa), and may amplify and/or filter the relayed radio frequency transmission. In some aspects, the UEs 120 shown in example 400 and example 410 may be associated with a Global Navigation Satellite System (GNSS) capability or a Global Positioning System (GPS) capability, though not all UEs have such capabilities. The satellite 440 may provide a cell that covers the UE 120.

As shown in FIG. 4, the service link 430 may include a link between the satellite 440 and the UE 120, and may include one or more of an uplink or a downlink. The feeder link 460 may include a link between the satellite 440 and the gateway 450, and may include one or more of an uplink (e.g., from the UE 120 to the gateway 450) or a downlink (e.g., from the gateway 450 to the UE 120). As shown in FIG. 4, an uplink of the service link 430 is indicated by reference number 430-U and a downlink of the service link 430 is indicated by reference number 430-D. Similarly, an uplink of the feeder link 460 is indicated by reference number 460-U and a downlink of the feeder link 460 is indicated by reference number 460-D.

The feeder link 460 and the service link 430 may each experience Doppler effects due to the movement of the satellites 420 and 440, and potentially movement of a UE 120. The Doppler effects may be significantly larger than in a terrestrial network. The Doppler effect on the feeder link 460 may be compensated for to some degree, but may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency. Furthermore, due to the long distance between the UE 120 and satellite 420/440, communication in an NTN may be associated with a much longer delay (e.g., a longer latency and/or a longer round trip time) than a delay associated with a terrestrial network. The delay may be even greater in a transparent satellite deployment, because any communication between the UE 120 and the gateway 450 must travel over the service link 430 and the feeder link 460, each of which may associated with a longer delay than a terrestrial network. The large propagation delay in an NTN may pose various challenges, including how to improve performance (e.g., reliability and/or robustness) for uplink transmissions. For example, in some cases, an uplink communication (e.g., msg3 in a four-step RACH procedure, a PUSCH, and/or a physical uplink control channel (PUCCH)) may be configured for HARQ-based retransmission, whereby a UE 120 may retransmit the uplink communication based at least in part on receiving HARQ feedback that indicates a negative acknowledgement (NACK) for the initial transmission of the uplink communication (e.g., based on a base station 110 failing to receive and/or decode the initial transmission).

However, in a wireless network with a large propagation delay (e.g., an NTN and/or an air-to-ground (ATG) communication system), HARQ-based retransmission may be inefficient because a UE 120 has to wait until the NACK is received to indicate that the base station 110 failed to receive and/or decode the initial transmission. Accordingly, in a wireless network with a large propagation delay, a base station 110 may configure one or more uplink communications to be transmitted using multiple repetitions to improve reliability and/or robustness. Furthermore, another technique that can be used to improve reliability and/or robustness for uplink transmissions is DMRS bundling in a time domain (e.g., across one or more symbols or slots), which allows the base station 110 to assume phase continuity for a DMRS over aggregated symbols or slots in which the bundled DMRSs are transmitted. For example, when DMRS bundling is enabled or otherwise configured, the base station may perform (joint) channel estimation based on DMRSs received across multiple symbols or slots, as opposed to performing channel estimation separately according to DMRSs received in individual symbols and/or consecutive symbols of the same channel. In this way, DMRS bundling in the time domain may allow the base station 110 to coherently filter or coherently combine bundled DMRSs received in different symbols or slots, which improves channel estimation accuracy by providing a coherent processing gain.

Furthermore, antenna switching is another technique that can be used to increase uplink performance by providing a significant diversity gain. For example, a UE 120 equipped with multiple antennas may perform antenna switching by transmitting one or more repetitions of a signal using a first transmit antenna and then transmitting one or more repetitions of the signal using a second transmit antenna. Accordingly, in some cases, antenna switching can be used in combination with repetitions and DMRS bundling to provide a significant performance gain for uplink transmissions (e.g., to compensate for a large propagation delay or otherwise increase uplink performance). For example, simulation results based on a tapped delay line (TDL) channel model (e.g., TDL-C, as defined in 3GPP TR 38.900) with a 100 nanosecond (ns) delay spread have shown that transmitting sixteen (16) repetitions of an uplink communication with DMRS bundling configured offers an approximately 2.7 decibel (dB) gain relative to transmitting sixteen (16) repetitions of the uplink communication without DMRS bundling at a $10^{-2}$ block error rate (BLER). Furthermore, simulation results have shown that configuring antenna switching can offer an additional 1.6 dB gain. However, one challenge that arises with respect to configuring antenna switching is that information related to antenna switching capabilities of a UE 120 (e.g., depending on a radio frequency or switch architecture of the UE 120) is typically transmitted to a network only after the UE 120 has established an RRC connection (e.g., after a successful RACH procedure is completed).

Accordingly, because an RRC connection has not been established at the time that the UE 120 initiates a four-step RACH procedure, the UE 120 may be unable to signal any capability information that may enable the base station 110 to configure antenna switching for an uplink communication associated with the four-step RACH procedure (e.g., a msg3 communication). The inability to configure antenna switching prior to establishing an RRC connection may create ambiguity with respect to an antenna switching point that the UE 120 uses for the uplink communication. For example, as described herein, "antenna switching point" may generally refer to a time when a UE 120 switches from transmitting a signal using a first transmit antenna (or first set of transmit antennas) to transmitting the signal using a second transmit antenna (or second set of transmit antennas). Accordingly, ambiguity in the antenna switching point may lead to erroneous channel estimation results at the base station 110, which may degrade or undermine any performance gain otherwise offered by antenna switching (e.g., if the base station 110 were to perform channel estimation and/or use coherent combining for uplink transmissions that are performed using different transmit antennas). Consequently, in addition to needing to know whether the UE 120 has an antenna switching capability, the base station 110 may need to know the antenna switching point in order to properly configure a channel estimation algorithm. Although a base station 110 can indicate an antenna switching point to a UE 120 in a DMRS bundling configuration that indicates DMRS bundling groups, the DMRS bundling configuration is typically signaled using RRC messages, which are unavailable at the time of a msg3 transmission because an RRC connection has not been established.

Some aspects described herein relate to techniques and apparatuses to indicate one or more antenna switching points for an uplink communication. For example, in some aspects, a UE may be provided with configuration information that indicates an antenna switching point for a msg3 communication in a four-step RACH procedure, whereby the UE may transmit one or more repetitions of the msg3 communication using a first transmit antenna prior to the antenna switching point and may transmit one or more repetitions of the msg3 communication using a second transmit antenna after the antenna switching point if the UE is equipped with multiple antennas. Accordingly, a network node may perform blind decoding by attempting a first channel estimation assuming that the UE performed antenna switching and attempting a second channel estimation assuming that the UE did not perform antenna switching. In this way, the network node may decode the msg3 communication using either the first channel estimation result or the second channel estimation result with no signaling of the antenna switching capability of the UE. Alternatively, in some aspects, the network node may partition RACH occasions (ROs) and/or preambles into a first subset for UEs that have antenna switching capabilities and a second subset for UEs that lack antenna switching capabilities. Accordingly, the UE may select an RO and/or a preamble to be used in a PRACH transmission. In this way, the network node may infer the antenna switching capability of the UE based on the RO and/or preamble selected by the UE for the PRACH transmission, whereby the network node may perform channel estimation for the subsequent msg3 communication based on the inferred antenna switching capability of the UE. Additionally, some aspects described herein provide techniques and apparatuses to configure one or more antenna switching points for a PUSCH or PUCCH communication after an RRC connection has been established. Accordingly, some aspects described herein provide various techniques to configure one or more antenna switching points for uplink transmissions and thereby increase uplink performance.

As indicated above, FIG. 4 is provided as an example. Other examples may differ from what is described with regard to FIG. 4.

Figure 5:
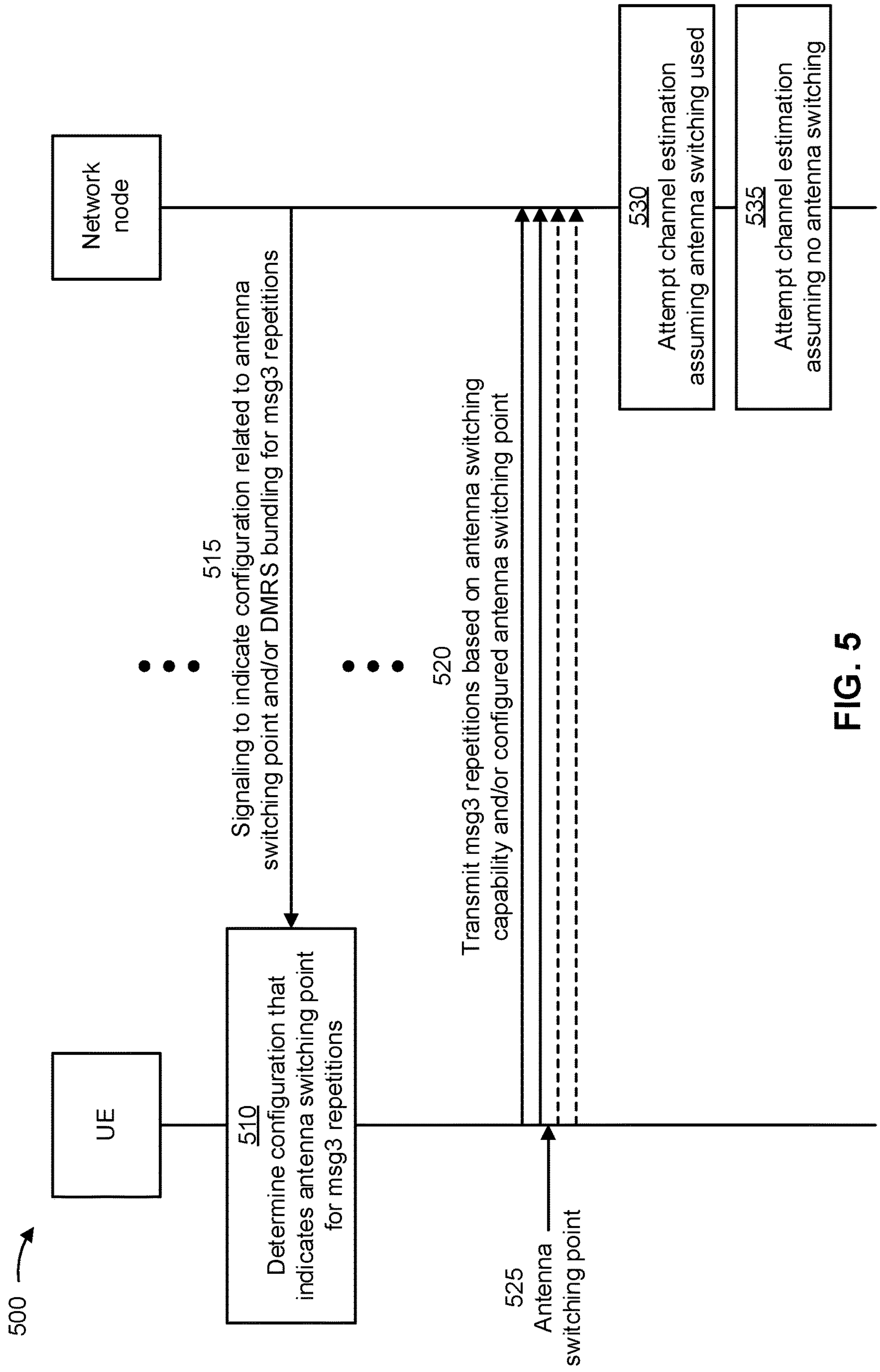
FIG. 5 is a diagram illustrating an example associated with an antenna switching indication for a msg3 transmission in a RACH procedure without signaling an antenna switching capability, in accordance with the present disclosure.

FIG. 5 is a diagram illustrating an example 500 associated with an antenna switching indication for a msg3 transmission in a RACH procedure without a UE signaling an antenna switching capability, in accordance with the present disclosure. As shown in FIG. 5, example 500 includes communication between a UE (e.g., UE 120) and a network node (e.g., base station 110, satellite 420, satellite 440, and/or gateway 450, among other examples). The UE and the network node may communicate in a wireless network, such as wireless network 100, which may be a terrestrial network, a non-terrestrial network (NTN) associated with a regenerative or transparent deployment, and/or an air-to-ground (ATG) communication system.

As shown in FIG. 5, and by reference number 510, the UE may determine a configuration that indicates one or more antenna switching points for msg3 repetitions associated with a four-step RACH procedure. For example, as described herein, the network node may generally configure multiple repetitions for a msg3 communication (e.g., in a system information block (SIB), random access configuration information, a random access response (RAR) message, and/or using other suitable techniques), and the configuration may indicate one or more antenna switching points associated with the multiple repetitions of the msg3 communication and/or a DMRS bundling configuration associated with the multiple repetitions of the msg3 communication. In this example, an antenna switching point may correspond to a time when a UE having antenna switching capabilities is to switch a transmit antenna that is used to transmit the msg3 communication. Furthermore, the DMRS bundling configuration may indicate a number of msg3 repetitions within which a DMRS is considered coherent (e.g., a number of repetitions in which bundled DMRSs are associated with the same precoder, analog beamforming filter, uplink power, and/or other transmission parameters such that the network node can assume phase continuity for the bundled DMRSs). In such cases, the network node may configure the DMRS bundling without configuring an antenna switching point, and the UE may use a boundary of the DMRS bundling as the antenna switching point.

In some aspects, the configuration that indicates the antenna switching point and/or DMRS bundling for the multiple repetitions of the msg3 communication may be specified in one or more wireless communication standards. In such cases, the configuration may be stored in a memory of the UE (e.g., as carrier settings). Alternatively, as shown by reference number 515, the network node may transmit, and the UE may receive, signaling to indicate the configuration that indicates the antenna switching point and/or DMRS bundling for the multiple repetitions of the msg3 communication. For example, in some aspects, the antenna switching point and/or DMRS bundling configuration may be indicated in an RAR message (e.g., in downlink control information (DCI), an RAR MAC sub-PDU, or a new MAC sub-PDU), or a msg2 communication, that the network node transmits to the UE as a reply to a PRACH. Alternatively, in some aspects, the antenna switching point and/or DMRS bundling for the multiple repetitions of the msg3 communication may be signaled in a SIB that the UE receives prior to initiating the four-step RACH procedure.

As further shown in FIG. 5, and by reference number 520, the UE may transmit multiple repetitions of the msg3 communication based on the antenna switching capability of the UE and/or the configured antenna switching point. For example, in cases where the UE lacks an antenna switching capability (e.g., the UE is not equipped with multiple transmit antennas and/or lacks a radio frequency or switching architecture to support switching between different transmit antennas), the UE may transmit the multiple repetitions of the msg3 communication without performing antenna switching (e.g., using the same transmit antenna). Alternatively, in cases where the UE has an antenna switching capability, the UE may transmit the multiple repetitions of the msg3 communication using different transmit antennas based on the antenna switching point indicated in the wireless communication standards and/or the signaling received from the network node. For example, when performing antenna switching, the UE may transmit one or more repetitions of the msg3 communication using a first transmit antenna prior to the antenna switching point, and may then transmit one or more repetitions of the msg3 communication using a second transmit antenna after the antenna switching point. For example, reference number 525 shows an example antenna switching point that is configured to occur at a midpoint of the multiple repetitions of the msg3 communication (e.g., after repetition $$K = \left\lfloor \frac{R}{2} \right\rfloor \text{ or } \left\lceil \frac{R}{2} \right\rceil,$$

where R is a number of repetitions configured for the msg3 communication). For example, in cases where sixteen repetitions are configured for the msg3 communication, the UE may transmit the first eight repetitions leading up to the antenna switching point using a first transmit antenna and may transmit the next eight repetitions after the antenna switching point using a second transmit antenna.

As further shown in FIG. 5, the network node may perform blind decoding of the msg3 communication without the UE signaling any information related to an antenna switching capability. For example, because the UE transmits the multiple repetitions of the msg3 communication during a four-step RACH procedure, prior to having established an RRC connection with the network node, the multiple repetitions of the msg3 communication are transmitted before any capability signaling is provided from the UE to the network node. In other words, at the time of receiving the multiple repetitions of the msg3 communication, the network node may be unable to determine whether the UE has an antenna switching capability and/or whether the UE performed antenna switching when transmitting the multiple repetitions of the msg3 communication. Accordingly, as shown by reference number 530, the network node may attempt to perform channel estimation for the multiple repetitions of the msg3 communication based on an assumption that antenna switching was used for the multiple repetitions of the msg3 communication (e.g., that repetitions before and after the antenna switching point were transmitted using different transmit antennas). Furthermore, as shown by reference number 535, the network node may attempt to perform channel estimation for the multiple repetitions of the msg3 communication based on an assumption that antenna switching was not used for the multiple repetitions of the msg3 communication (e.g., that repetitions before and after the antenna switching point were transmitted using the same transmit antennas). Furthermore, in some aspects, the first channel estimation and the second channel estimation may be attempted based on any DMRS bundling configuration that may have been configured for the multiple repetitions of the msg3 communication. In this way, the network node may obtain a correct channel estimation result that can be used to decode the msg3 communication regardless of whether the UE did or did not perform antenna switching and without the UE signaling any antenna switching capability to the network node.

As indicated above, FIG. 5 is provided as an example. Other examples may differ from what is described with regard to FIG. 5.

Figure 6A:
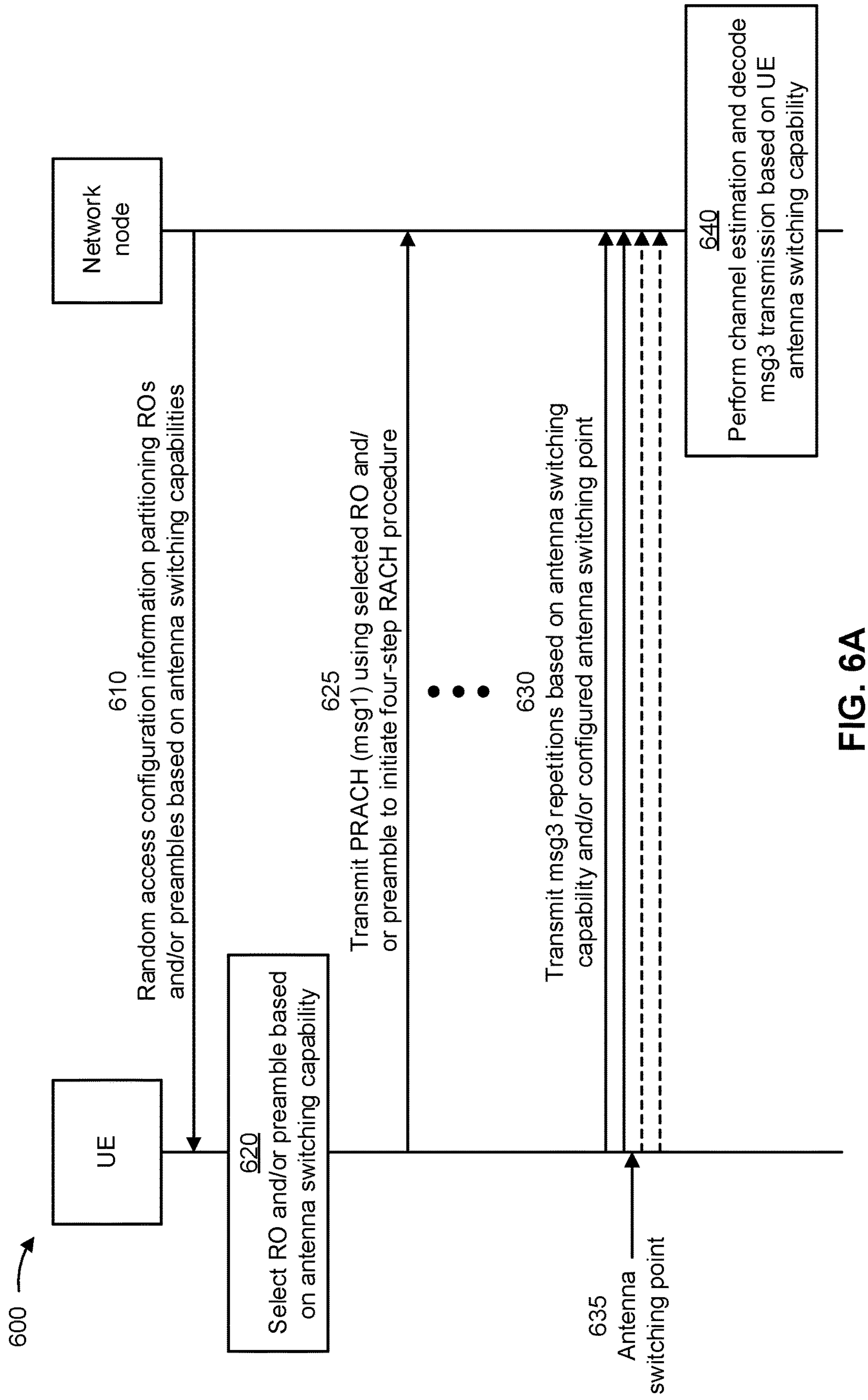
FIGS. 6A-6B are diagrams illustrating an example associated with an antenna switching indication for a msg3 transmission in a RACH procedure with implicit signaling of an antenna switching capability, in accordance with the present disclosure.
Figure 6B:
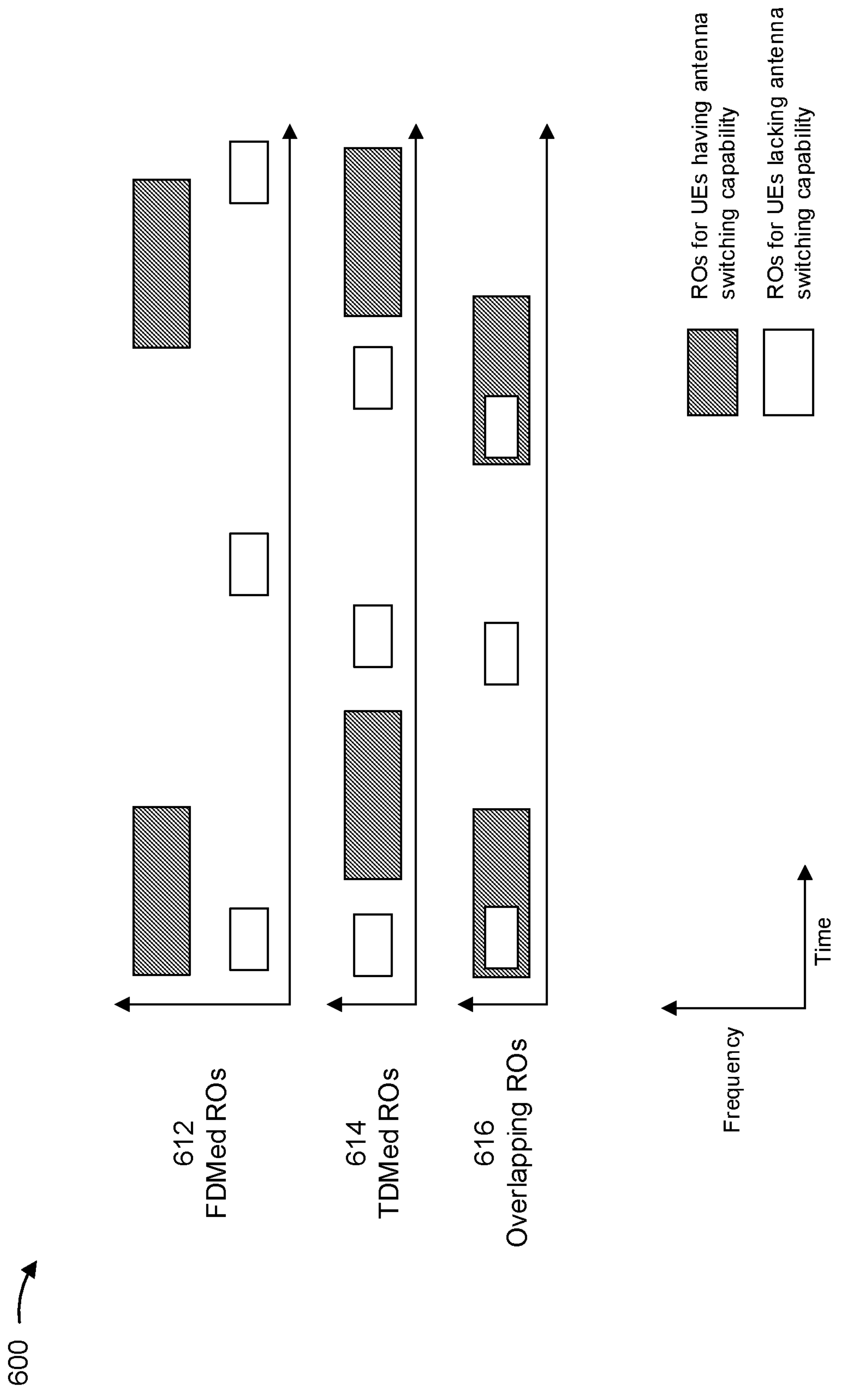

FIGS. 6A-6B are diagrams illustrating an example associated with an antenna switching indication for a msg3 transmission in a RACH procedure with implicit signaling of an antenna switching capability, in accordance with the present disclosure. As shown in FIG. 6A, example 600 includes communication between a UE (e.g., UE 120) and a network node (e.g., base station 110, satellite 420, satellite 440, and/or gateway 450, among other examples). The UE and the network node may communicate in a wireless network, such as wireless network 100, which may be a terrestrial network, an NTN associated with a regenerative or transparent deployment, and/or an ATG communication system.

As shown in FIG. 6A, and by reference number 610, the network node may transmit, and the UE may receive, random access configuration information that partitions ROs and/or preambles associated with a four-step RACH procedure into a first subset for UEs that have an antenna switching capability (e.g., a capability to switch between or among two or more transmit antennas) and a second subset for UEs that lack an antenna switching capability. For example, in some aspects, the random access configuration information may include a SIB to indicate the partitioning of the ROs and/or preambles. Furthermore, in some aspects, the random access configuration information, a SIB carrying the random access configuration information, or another suitable message may indicate an antenna switching point to be used for a msg3 communication by UEs that have an antenna switching capability.

In some aspects, as described herein, the ROs and/or preambles that are partitioned into the different subsets may have different configurations to distinguish the different subsets and/or minimize interference between different subsets. For example, as shown in FIG. 6B, and by reference number 612, ROs that are configured for UEs having an antenna switching capability may be frequency division multiplexed (FDMed) with respect to ROs that are configured for UEs lacking an antenna switching capability. For example, the FDMed ROs in different subsets may be associated with different frequency domain resource allocations (e.g., ROs in different subsets are located in different sub-bands, bandwidth parts, and/or component carriers, among other examples). In another example, as shown by reference number 614, ROs that are configured for UEs having an antenna switching capability may be time division multiplexed (TDMed) with respect to ROs that are configured for UEs lacking an antenna switching capability. For example, the TDMed ROs in different subsets may be associated with the same frequency domain resource allocation but are non-overlapping in a time domain (e.g., the ROs in different RO subsets occupy different slots, symbols, or other transmission time intervals). In another example, as shown by reference number 616, different RO subsets may be associated with an overlapping resource allocation (e.g., where an RO configured for UEs with an antenna switching capability and an RO configured for UEs without an antenna switching capability can occupy the same time and frequency resource(s)). In such cases, preambles associated with the different RO subsets may use the same root sequence with different cyclic shifts (such that the preambles in different RO subsets are orthogonal), or the preambles associated with the different RO subsets may use different root sequences (such that the preambles in different RO subsets have a small correlation, even though the preambles may not be exactly orthogonal). In this way, the network node may configure the ROs and/or preambles in different subsets to minimize interference.

As further shown in FIG. 6A, and by reference number 620, the UE may select an RO and/or a preamble for the appropriate subset based on the antenna switching capability of the UE. For example, in cases where the UE has an antenna switching capability, the UE may select an RO and/or a preamble from the subset that is configured for UEs having an antenna switching capability. Otherwise, in cases where the UE lacks antenna switching capabilities, the UE may select an RO and/or a preamble from the subset configured for UEs lacking an antenna switching capability.

As further shown in FIG. 6A, and by reference number 625, the UE may transmit, and the network node may receive, a PRACH (msg1) communication using the RO and/or preamble in the subset selected by the UE. In this way, the RO and/or preamble used for the PRACH communication may implicitly signal the antenna switching capability of the UE. For example, the base station may determine that the UE has an antenna switching capability if the RO and/or preamble used for the PRACH communication is included in the subset configured for UEs that have an antenna switching capability, or may alternatively determine that the UE lacks antenna switching capabilities if the RO and/or preamble used for the PRACH communication is included in the subset configured for UEs that lack antenna switching capabilities.

As further shown in FIG. 6A, and by reference number 630, the UE may transmit multiple repetitions of the msg3 communication based on the antenna switching capability of the UE and/or the configured antenna switching point, which the network node may indicate to the UE in a SIB and/or an RAR transmitted to the UE as a reply to the PRACH communication. Alternatively, as described above, the antenna switching point to be used for the msg3 communication may be defined in one or more wireless communication standards. In some aspects, in cases where the UE lacks an antenna switching capability (e.g., the UE is not equipped with multiple transmit antennas and/or lacks a radio frequency or switching architecture to support switching between different transmit antennas), the UE may transmit the multiple repetitions of the msg3 communication without performing antenna switching (e.g., using the same transmit antenna). Alternatively, in cases where the UE has an antenna switching capability, the UE may transmit the multiple repetitions of the msg3 communication using different transmit antennas based on the antenna switching point indicated in the wireless communication standards and/or the signaling received from the network node. For example, when performing antenna switching, the UE may transmit one or more repetitions of the msg3 communication using a first transmit antenna prior to the antenna switching point, and may then transmit one or more repetitions of the msg3 communication using a second transmit antenna after the antenna switching point. For example, reference number 635 shows an example antenna switching point that is configured to occur at a midpoint of the multiple repetitions of the msg3 communication (e.g., after repetition $$K = \left\lfloor \frac{R}{2} \right\rfloor \text{ or } \left\lceil \frac{R}{2} \right\rceil,$$

where R is a number of repetitions configured for the msg3 communication). For example, in cases where five repetitions are configured for the msg3 communication, the UE may transmit the first two repetitions leading up to the antenna switching point using a first transmit antenna and may transmit the next three repetitions after the antenna switching point using a second transmit antenna if a floor function is used to determine the midpoint of the multiple repetitions, or the UE may switch antennas after the third repetition if a ceiling function is used to determine the midpoint of the multiple repetitions.

As further shown in FIG. 6A, and by reference number 640, the network node may perform channel estimation and decode the msg3 communication based on the antenna switching capability of the UE, which is implicitly signaled by the RO and/or preamble used in the PRACH (msg1) communication. Accordingly, at the time of receiving the multiple repetitions of the msg3 communication, the network node may know whether the UE performed antenna switching when transmitting the multiple repetitions of the msg3 communication, whereby the network node may perform channel estimation for the multiple repetitions of the msg3 communication separately for the repetitions received before the antenna switching point and the repetitions received after the antenna switching point if the UE transmitted the PRACH using an RO and/or preamble in the subset configured for UEs that have antenna switching capabilities. Alternatively, the network node may perform joint channel estimation for the multiple repetitions of the msg3 communication received before and after the antenna switching point if the UE transmitted the PRACH using an RO and/or preamble in the subset configured for UEs that lack antenna switching capabilities. Furthermore, in some aspects, the network node may perform the channel estimation based on any DMRS bundling configuration that may have been configured for the multiple repetitions of the msg3 communication. In this way, the network node may obtain a correct channel estimation result that can be used to decode the msg3 communication based on the UE implicitly signaling the antenna switching capability of the UE to the network node.

As indicated above, FIGS. 6A-6B are provided as an example. Other examples may differ from what is described with regard to FIGS. 6A-6B.

Figure 7:
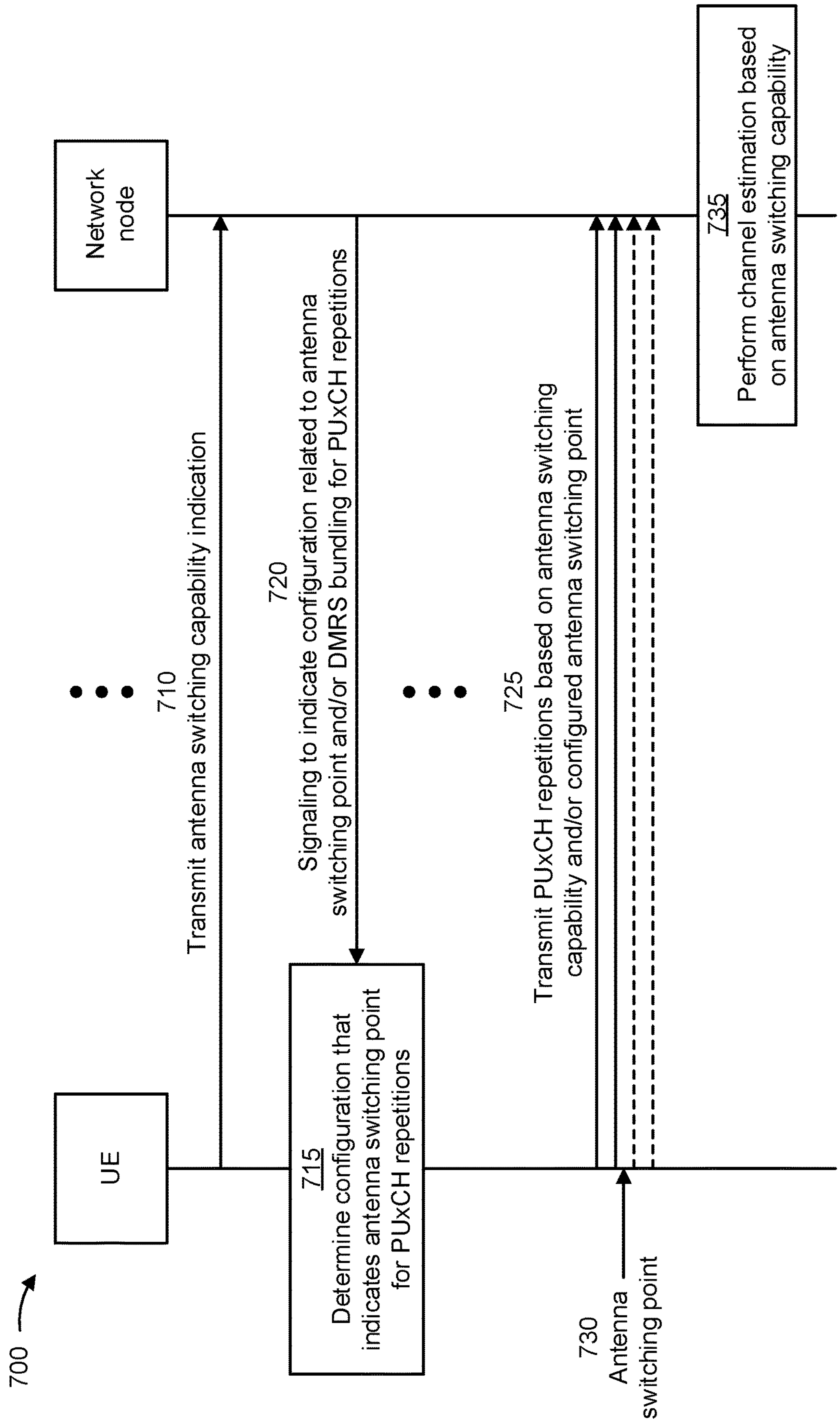
FIG. 7 is a diagram illustrating an example associated with an antenna switching indication for an uplink channel transmission, in accordance with the present disclosure.

FIG. 7 is a diagram illustrating an example 700 associated with an antenna switching indication for an uplink channel transmission, in accordance with the present disclosure. As shown in FIG. 7, example 700 includes communication between a UE (e.g., UE 120) and a network node (e.g., base station 110, satellite 420, satellite 440, and/or gateway 450, among other examples). The UE and the network node may communicate in a wireless network, such as wireless network 100, which may be a terrestrial network, an NTN associated with a regenerative or transparent deployment, and/or an ATG communication system.

As shown in FIG. 7, and by reference number 710, the UE may transmit an antenna switching capability indication to the network node. For example, after the UE and the network node have completed a successful RACH procedure (e.g., a four-step or two-step RACH procedure), the UE may enter an RRC connected state in which the UE can provide capability signaling to the network node via RRC messages. Accordingly, in some aspects, the UE may transmit information to the network node to indicate whether the UE supports antenna switching such that the network node can correctly determine an antenna switching point for performing channel estimation for a PUSCH or PUCCH that the UE is configured to transmit in multiple repetitions.

As further shown in FIG. 7, and by reference number 715, the UE may determine a configuration that indicates an antenna switching point for a PUSCH and/or a PUCCH configured to be transmitted in multiple repetitions. For example, as described herein, the configuration may indicate the antenna switching point associated with the multiple repetitions of a PUSCH communication and/or a PUCCH communication and/or a DMRS bundling configuration associated with the multiple repetitions of the PUSCH and/or PUCCH communication. In this example, the antenna switching point may correspond to a time when a UE having antenna switching capabilities is to switch a transmit antenna that is used to transmit the PUSCH and/or PUCCH communication. Furthermore, the DMRS bundling configuration may indicate a number of PUSCH and/or PUCCH repetitions within which a DMRS is considered coherent (e.g., a number of repetitions in which bundled DMRSs are associated with the same precoder, analog beamforming filter, uplink power, and/or other transmission parameters such that the network node can assume phase continuity for the bundled DMRSs). In such cases, the network node may configure the DMRS bundling without configuring an antenna switching point, and the UE may determine that the antenna switching point corresponds to a boundary of the DMRS bundling (e.g., the UE may transmit using a first antenna prior to the boundary of the DMRS bundling, and may then transmit using a second antenna after the boundary of the DMRS bundling).

In some aspects, the configuration that indicates the antenna switching point and/or DMRS bundling for the multiple repetitions of the PUSCH and/or PUCCH communication may be specified in one or more wireless communication standards. In such cases, the configuration may be stored in a memory of the UE (e.g., as carrier settings). Alternatively, as shown by reference number 720, the network node may transmit, and the UE may receive, signaling to indicate the configuration that indicates the antenna switching point and/or DMRS bundling for the multiple repetitions of the PUSCH and/or PUCCH communication. For example, because the PUSCH and/or PUCCH communication is generally scheduled after the UE has established an RRC connection, the antenna switching point and/or DMRS bundling configuration may be indicated in an RRC message, a medium access control (MAC) control element (MAC-CE), or DCI. Alternatively, in some aspects, the antenna switching point and/or DMRS bundling for the multiple repetitions of the PUSCH and/or PUCCH communication may be signaled in a SIB.

As further shown in FIG. 7, and by reference number 725, the UE may transmit multiple repetitions of the PUSCH and/or PUCCH communication based on the antenna switching capability of the UE and/or the configured antenna switching point. For example, in cases where the UE lacks an antenna switching capability (e.g., the UE is not equipped with multiple transmit antennas and/or lacks a radio frequency or switching architecture to support switching between different transmit antennas), the UE may transmit the multiple repetitions of the PUSCH and/or PUCCH communication without performing antenna switching (e.g., using the same transmit antenna). Alternatively, in cases where the UE has an antenna switching capability, the UE may transmit the multiple repetitions of the PUSCH and/or PUCCH communication using different transmit antennas based on the antenna switching point indicated in the wireless communication standards and/or the signaling received from the network node. For example, when performing antenna switching, the UE may transmit one or more repetitions of the PUSCH and/or PUCCH communication using a first transmit antenna prior to the antenna switching point, and may then transmit one or more repetitions of the PUSCH and/or PUCCH communication using a second transmit antenna after the antenna switching point. For example, reference number 730 shows an example antenna switching point that is configured to occur at a midpoint of the multiple repetitions of the msg3 communication. However, it will be appreciated that the antenna switching point may occur after any suitable PUSCH or PUCCH repetition.

As further shown in FIG. 7, and by reference number 735, the network node may perform channel estimation and decode the PUSCH or PUCCH communication based on the antenna switching capability signaled by the UE. Accordingly, at the time of receiving the multiple repetitions of the PUSCH or PUCCH communication, the network node may know whether the UE performed antenna switching when transmitting the multiple repetitions of the PUSCH or PUCCH communication. In this way, the network node may perform channel estimation for the multiple repetitions of the PUSCH or PUCCH communication separately for the repetitions received before the antenna switching point and the repetitions received after the antenna switching point if the UE indicated support for antenna switching. Alternatively, the network node may perform joint channel estimation for the multiple repetitions of the PUSCH or PUCCH communication received before and after the antenna switching point if the UE signaled a lack of antenna switching capabilities. Furthermore, in some aspects, the network node may perform the channel estimation based on any DMRS bundling configuration that may have been configured for the multiple repetitions of the PUSCH or PUCCH communication. In this way, the network node may obtain a correct channel estimation result that can be used to decode the PUSCH or PUCCH communication based on the antenna switching capability of the UE.

As indicated above, FIG. 7 is provided as an example. Other examples may differ from what is described with regard to FIG. 7.

Figure 8:
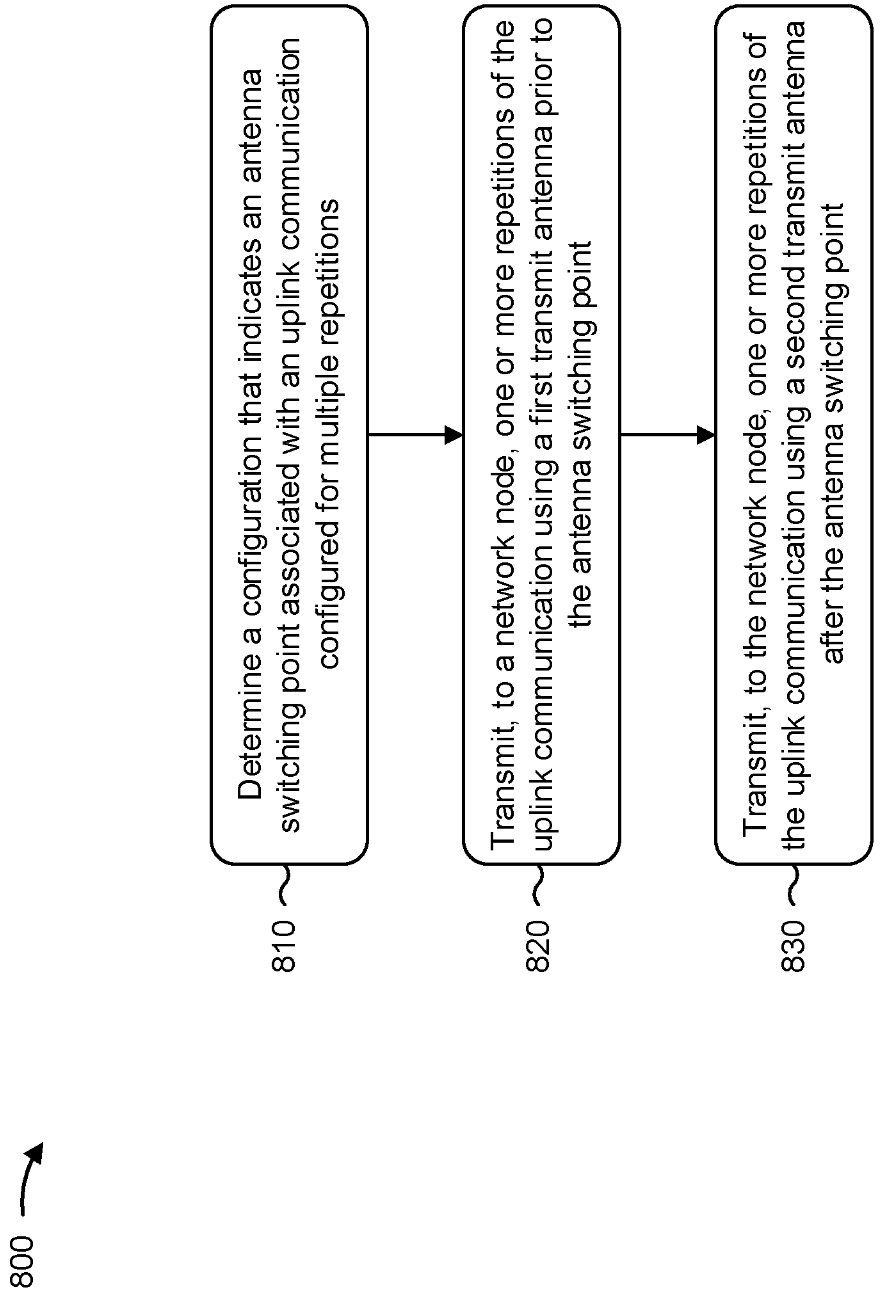
FIGS. 8-9 are diagrams illustrating example processes associated with an antenna switching indication for an uplink transmission, in accordance with the present disclosure.

FIG. 8 is a diagram illustrating an example process 800 performed, for example, by a UE, in accordance with the present disclosure. Example process 800 is an example where the UE (e.g., UE 120) performs operations associated with an antenna switching indication for an uplink transmission.

As shown in FIG. 8, in some aspects, process 800 may include determining a configuration that indicates an antenna switching point associated with an uplink communication configured for multiple repetitions (block 810). For example, the UE (e.g., using determination component 1008, depicted in FIG. 10) may determine a configuration that indicates an antenna switching point associated with an uplink communication configured for multiple repetitions, as described above.

As further shown in FIG. 8, in some aspects, process 800 may include transmitting, to a network node, one or more repetitions of the uplink communication using a first transmit antenna prior to the antenna switching point (block 820). For example, the UE (e.g., using transmission component 1004, depicted in FIG. 10) may transmit, to a network node, one or more repetitions of the uplink communication using a first transmit antenna prior to the antenna switching point, as described above.

As further shown in FIG. 8, in some aspects, process 800 may include transmitting, to the network node, one or more repetitions of the uplink communication using a second transmit antenna after the antenna switching point (block 830). For example, the UE (e.g., using transmission component 1004, depicted in FIG. 10) may transmit, to the network node, one or more repetitions of the uplink communication using a second transmit antenna after the antenna switching point, as described above.

Process 800 may include additional aspects, such as any single aspect or any combination of aspects described below and/or in connection with one or more other processes described elsewhere herein.

In a first aspect, the antenna switching point is based at least in part on a boundary of a DMRS bundle in a DMRS bundling configuration associated with the uplink communication.

In a second aspect, alone or in combination with the first aspect, process 800 includes receiving the configuration that indicates the antenna switching point in an RAR message associated with a RACH procedure, and the uplink communication associated with the antenna switching point is a msg3 communication transmitted after receiving the RAR message.

In a third aspect, alone or in combination with one or more of the first and second aspects, process 800 includes receiving the configuration that indicates the antenna switching point in a SIB.

In a fourth aspect, alone or in combination with one or more of the first through third aspects, the configuration is specified in a wireless communication standard.

In a fifth aspect, alone or in combination with one or more of the first through fourth aspects, process 800 includes receiving the configuration that indicates the antenna switching point in an RRC message, a MAC-CE, or DCI based at least in part on the uplink communication including a PUSCH or a PUCCH.

In a sixth aspect, alone or in combination with one or more of the first through fifth aspects, the configuration indicates that the antenna switching point is at a midpoint of the multiple repetitions that is defined using a floor or ceiling function according to a number of the multiple repetitions.

In a seventh aspect, alone or in combination with one or more of the first through sixth aspects, process 800 includes receiving, from the network node, random access configuration information that partitions ROs or preambles into a first subset for UEs having an antenna switching capability and a second subset for UEs lacking the antenna switching capability, selecting an RO or a preamble in the first subset based at least in part on the UE having the antenna switching capability, and transmitting, to the network node, a PRACH using the RO or the preamble selected from the first subset to initiate a four-step RACH procedure.

In an eighth aspect, alone or in combination with one or more of the first through seventh aspects, process 800 includes receiving, from the network node, the configuration that indicates the antenna switching point for msg3 of the four-step RACH procedure based at least in part on transmitting the PRACH using the RO or the preamble selected from the first subset for UEs having the antenna switching capability.

In a ninth aspect, alone or in combination with one or more of the first through eighth aspects, the network node is an NTN node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
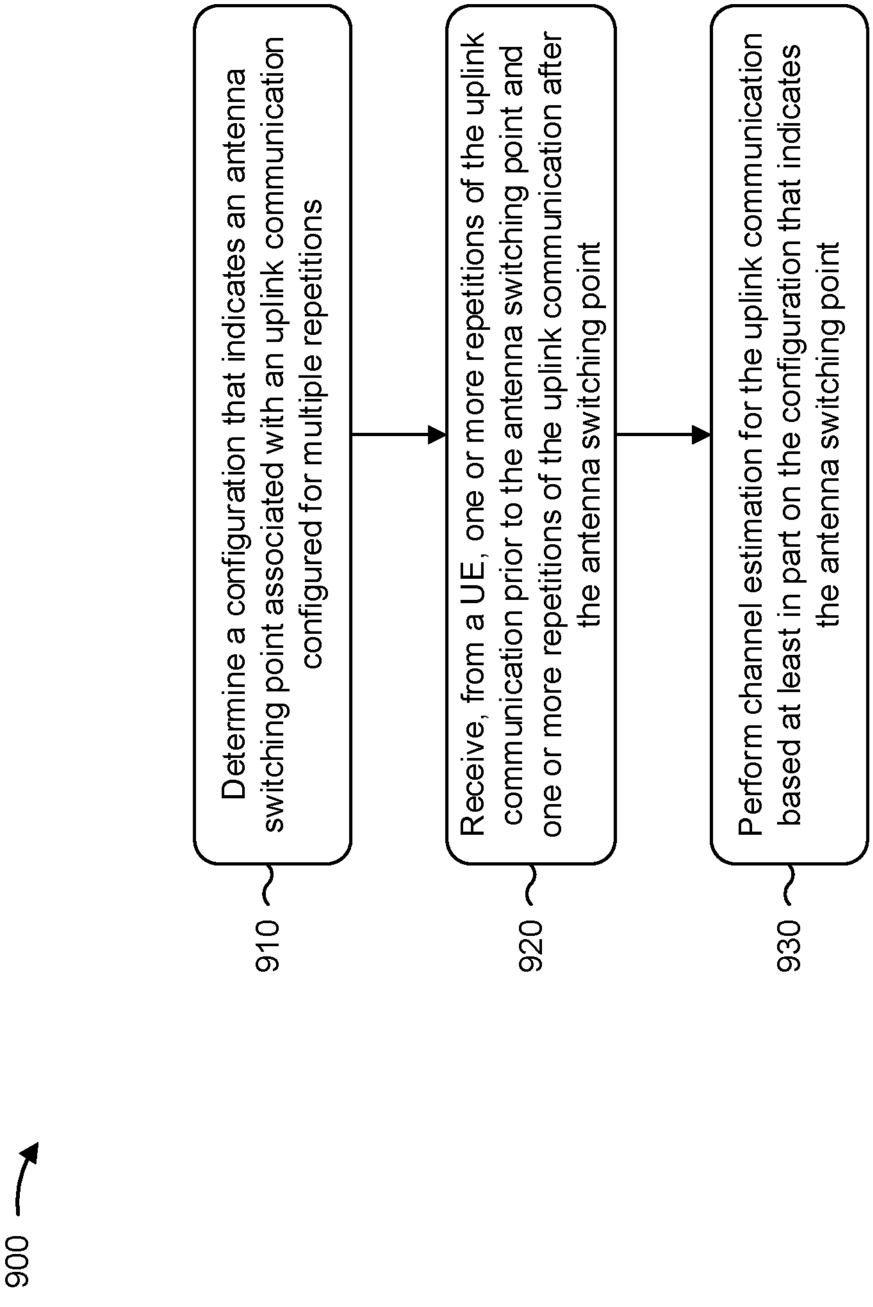

FIG. 9 is a diagram illustrating an example process 900 performed, for example, by a network node, in accordance with the present disclosure. Example process 900 is an example where the network node (e.g., base station 110, satellite 420, satellite 440, and/or gateway 450, among other examples) performs operations associated with an antenna switching indication for an uplink transmission.

As shown in FIG. 9, in some aspects, process 900 may include determining a configuration that indicates an antenna switching point associated with an uplink communication configured for multiple repetitions (block 910). For example, the network node (e.g., using determination component 1108, depicted in FIG. 11) may determine a configuration that indicates an antenna switching point associated with an uplink communication configured for multiple repetitions, as described above.

As further shown in FIG. 9, in some aspects, process 900 may include receiving, from a UE, one or more repetitions of the uplink communication prior to the antenna switching point and one or more repetitions of the uplink communication after the antenna switching point (block 920). For example, the network node (e.g., using reception component 1102, depicted in FIG. 11) may receive, from a UE, one or more repetitions of the uplink communication prior to the antenna switching point and one or more repetitions of the uplink communication after the antenna switching point, as described above.

As further shown in FIG. 9, in some aspects, process 900 may include performing channel estimation for the uplink communication based at least in part on the configuration that indicates the antenna switching point (block 930). For example, the network node (e.g., using channel estimation component 1110, depicted in FIG. 11) may perform channel estimation for the uplink communication based at least in part on the configuration that indicates the antenna switching point, as described above.

Process 900 may include additional aspects, such as any single aspect or any combination of aspects described below and/or in connection with one or more other processes described elsewhere herein.

In a first aspect, performing the channel estimation includes attempting channel estimation according to a first assumption that the UE performed an antenna switch at the antenna switching point, and according to a second assumption that the UE did not perform an antenna switch at the antenna switching point, based at least in part on the uplink communication including a msg3 communication associated with a RACH procedure.

In a second aspect, alone or in combination with the first aspect, process 900 includes decoding the msg3 communication based at least in part on a channel estimation result associated with the first assumption or the second assumption.

In a third aspect, alone or in combination with one or more of the first and second aspects, the antenna switching point is based at least in part on a boundary of a DMRS bundle in a DMRS bundling configuration associated with the uplink communication.

In a fourth aspect, alone or in combination with one or more of the first through third aspects, process 900 includes transmitting the configuration that indicates the antenna switching point in an RAR message associated with a RACH procedure, and the uplink communication associated with the antenna switching point is a msg3 communication subsequent to the RAR message.

In a fifth aspect, alone or in combination with one or more of the first through fourth aspects, process 900 includes transmitting the configuration that indicates the antenna switching point in a SIB.

In a sixth aspect, alone or in combination with one or more of the first through fifth aspects, the configuration is specified in a wireless communication standard.

In a seventh aspect, alone or in combination with one or more of the first through sixth aspects, process 900 includes transmitting the configuration that indicates the antenna switching point in an RRC message, a MAC-CE, or DCI based at least in part on the uplink communication including a PUSCH or a PUCCH.

In an eighth aspect, alone or in combination with one or more of the first through seventh aspects, the configuration indicates that the antenna switching point is at a midpoint of the multiple repetitions that is defined using a floor or ceiling function according to a number of the multiple repetitions.

In a ninth aspect, alone or in combination with one or more of the first through eighth aspects, process 900 includes transmitting random access configuration information that partitions ROs or preambles into a first subset for UEs having an antenna switching capability and a second subset for UEs lacking the antenna switching capability, receiving, from the UE, a PRACH to initiate a four-step RACH procedure using an RO or a preamble selected from the first subset or the second subset, and determining whether the UE has the antenna switching capability based at least in part on the RO or the preamble associated with the PRACH.

In a tenth aspect, alone or in combination with one or more of the first through ninth aspects, process 900 includes transmitting, to the UE, the configuration that indicates the antenna switching point for msg3 of the four-step RACH procedure based at least in part on determining that the UE has the antenna switching capability.

In an eleventh aspect, alone or in combination with one or more of the first through tenth aspects, the network node is an NTN node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
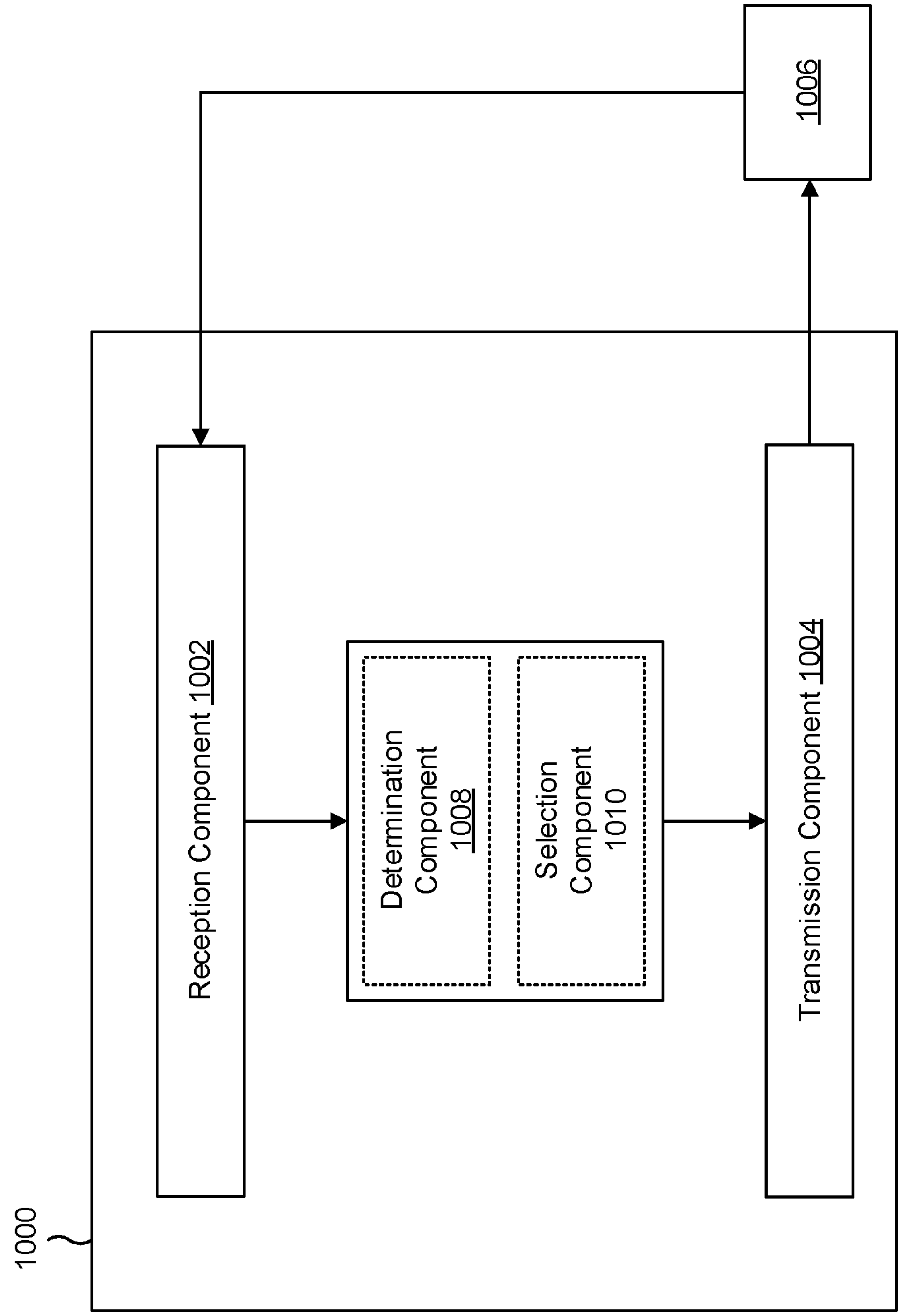
FIGS. 10-11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a determination component 1008 or a selection component 1010, among other examples.

In some aspects, the apparatus 1000 may be configured to perform one or more operations described herein in connection with FIG. 5, FIGS. 6A-6B, and/or FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The determination component 1008 may determine a configuration that indicates an antenna switching point associated with an uplink communication configured for multiple repetitions. The transmission component 1004 may transmit, to a network node, one or more repetitions of the uplink communication using a first transmit antenna prior to the antenna switching point. The transmission component 1004 may transmit, to the network node, one or more repetitions of the uplink communication using a second transmit antenna after the antenna switching point.

The reception component 1002 may receive the configuration that indicates the antenna switching point in an RAR message associated with a RACH procedure, where the uplink communication associated with the antenna switching point is a msg3 communication transmitted after receiving the RAR message.

The reception component 1002 may receive the configuration that indicates the antenna switching point in a SIB.

The reception component 1002 may receive the configuration that indicates the antenna switching point in an RRC message, a MAC-CE, or DCI based at least in part on the uplink communication including a PUSCH or a PUCCH.

The reception component 1002 may receive, from the network node, random access configuration information that partitions ROs or preambles into a first subset for UEs having an antenna switching capability and a second subset for UEs lacking the antenna switching capability. The selection component 1010 may select an RO or a preamble in the first subset based at least in part on the UE having the antenna switching capability. The transmission component 1004 may transmit, to the network node, a PRACH using the RO or the preamble selected from the first subset to initiate a four-step RACH procedure.

The reception component 1002 may receive, from the network node, the configuration that indicates the antenna switching point for msg3 of the four-step RACH procedure based at least in part on transmitting the PRACH using the RO or the preamble selected from the first subset for UEs having the antenna switching capability.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
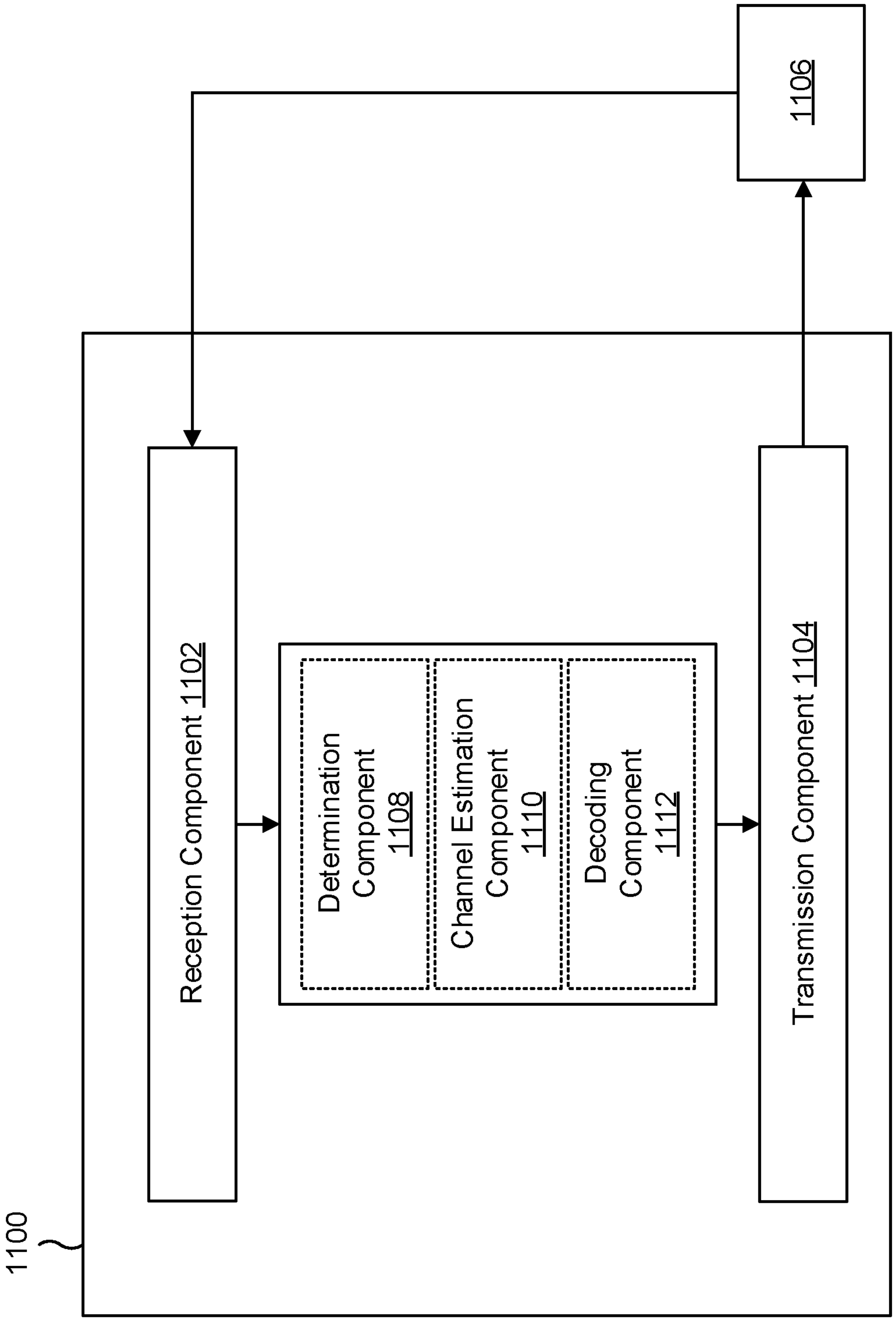

FIG. 11 is a block diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a determination component 1108, a channel estimation component 1110, or a decoding component 1112, among other examples.

In some aspects, the apparatus 1100 may be configured to perform one or more operations described herein in connection with FIG. 5, FIGS. 6A-6B, and/or FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the network node described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the network node described above in connection with FIG. 2. In some aspects, the transmission component 1104 may be co-located with the reception component 1102 in a transceiver.

The determination component 1108 may determine a configuration that indicates an antenna switching point associated with an uplink communication configured for multiple repetitions. The reception component 1102 may receive, from a UE, one or more repetitions of the uplink communication prior to the antenna switching point and one or more repetitions of the uplink communication after the antenna switching point. The channel estimation component 1110 may perform channel estimation for the uplink communication based at least in part on the configuration that indicates the antenna switching point.

The channel estimation component 1110 may attempt channel estimation according to a first assumption that the UE performed an antenna switch at the antenna switching point and according to a second assumption that the UE did not perform an antenna switch at the antenna switching point based at least in part on the uplink communication including a msg3 communication associated with a random access channel procedure.

The decoding component 1112 may decode the msg3 communication based at least in part on a channel estimation result associated with the first assumption or the second assumption.

The transmission component 1104 may transmit the configuration that indicates the antenna switching point in an RAR message associated with a RACH procedure, where the uplink communication associated with the antenna switching point is a msg3 communication subsequent to the RAR message.

The transmission component 1104 may transmit the configuration that indicates the antenna switching point in a SIB.

The transmission component 1104 may transmit the configuration that indicates the antenna switching point in an RRC message, a MAC-CE, or DCI based at least in part on the uplink communication including a PUSCH or a PUCCH.

The transmission component 1104 may transmit random access configuration information that partitions ROs or preambles into a first subset for UEs having an antenna switching capability and a second subset for UEs lacking the antenna switching capability. The reception component 1102 may receive, from the UE, a PRACH to initiate a four-step RACH procedure using an RO or a preamble selected from the first subset or the second subset. The determination component 1108 may determine whether the UE has the antenna switching capability based at least in part on the RO or the preamble associated with the PRACH.

The transmission component 1104 may transmit, to the UE, the configuration that indicates the antenna switching point for msg3 of the four-step RACH procedure based at least in part on determining that the UE has the antenna switching capability.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: determining a configuration that indicates an antenna switching point associated with an uplink communication configured for multiple repetitions; transmitting, to a network node, one or more repetitions of the uplink communication using a first transmit antenna prior to the antenna switching point; and transmitting, to the network node, one or more repetitions of the uplink communication using a second transmit antenna after the antenna switching point.

Aspect 2: The method of Aspect 1, wherein the antenna switching point is based at least in part on a boundary of a DMRS bundle in a DMRS bundling configuration associated with the uplink communication.

Aspect 3: The method of any of Aspects 1-2, further comprising: receiving the configuration that indicates the antenna switching point in an RAR message associated with a RACH procedure, wherein the uplink communication associated with the antenna switching point is a msg3 communication transmitted after receiving the RAR message.

Aspect 4: The method of any of Aspects 1-2, further comprising: receiving the configuration that indicates the antenna switching point in a SIB.

Aspect 5: The method of any of Aspects 1-2, wherein the configuration is specified in a wireless communication standard.

Aspect 6: The method of any of Aspects 1-2, further comprising: receiving the configuration that indicates the antenna switching point in an RRC message, a MAC-CE, or DCI based at least in part on the uplink communication including a PUSCH or a PUCCH.

Aspect 7: The method of any of Aspects 1-6, wherein the configuration indicates that the antenna switching point is at a midpoint of the multiple repetitions that is defined using a floor or ceiling function according to a number of the multiple repetitions.

Aspect 8: The method of any of Aspects 1-5 or 7, further comprising: receiving, from the network node, random access configuration information that partitions ROs or preambles into a first subset for UEs having an antenna switching capability and a second subset for UEs lacking the antenna switching capability; selecting an RO or a preamble in the first subset based at least in part on the UE having the antenna switching capability; and transmitting, to the network node, a PRACH using the RO or the preamble selected from the first subset to initiate a four-step RACH procedure.

Aspect 9: The method of Aspect 8, further comprising: receiving, from the network node, the configuration that indicates the antenna switching point for msg3 of the four-step RACH procedure based at least in part on transmitting the PRACH using the RO or the preamble selected from the first subset for UEs having the antenna switching capability.

Aspect 10: The method of any of Aspects 1-9, wherein the network node is an NTN node.

Aspect 11: A method of wireless communication performed by a network node, comprising: determining a configuration that indicates an antenna switching point associated with an uplink communication configured for multiple repetitions; receiving, from a UE, one or more repetitions of the uplink communication prior to the antenna switching point and one or more repetitions of the uplink communication after the antenna switching point; and performing channel estimation for the uplink communication based at least in part on the configuration that indicates the antenna switching point.

Aspect 12: The method of Aspect 11, wherein performing the channel estimation includes: attempting channel estimation according to a first assumption that the UE performed an antenna switch at the antenna switching point and according to a second assumption that the UE did not perform an antenna switch at the antenna switching point based at least in part on the uplink communication including a msg3 communication associated with a RACH procedure.

Aspect 13: The method of Aspect 12, further comprising: decoding the msg3 communication based at least in part on a channel estimation result associated with the first assumption or the second assumption.

Aspect 14: The method of any of Aspects 11-13, antenna switching point is based at least in part on a boundary of a DMRS bundle in a DMRS bundling configuration associated with the uplink communication.

Aspect 15: The method of any of Aspects 11-14, further comprising: transmitting the configuration that indicates the antenna switching point in an RAR message associated with a RACH procedure, wherein the uplink communication associated with the antenna switching point is a msg3 communication subsequent to the RAR message.

Aspect 16: The method of any of Aspects 11-14, further comprising: transmitting the configuration that indicates the antenna switching point in a SIB.

Aspect 17: The method of any of Aspects 11-14, wherein the configuration is specified in a wireless communication standard.

Aspect 18: The method of any of Aspects 11 or 14, further comprising: transmitting the configuration that indicates the antenna switching point in an RRC message, a MAC-CE, or DCI based at least in part on the uplink communication including a PUSCH or a PUCCH.

Aspect 19: The method of any of Aspects 11-18, wherein the configuration indicates that the antenna switching point is at a midpoint of the multiple repetitions that is defined using a floor or ceiling function according to a number of the multiple repetitions.

Aspect 20: The method of any of Aspects 11, 14-17, or 19, further comprising: transmitting random access configuration information that partitions ROs or preambles into a first subset for UEs having an antenna switching capability and a second subset for UEs lacking the antenna switching capability; receiving, from the UE, a PRACH to initiate a four-step RACH procedure using an RO or a preamble selected from the first subset or the second subset; and determining whether the UE has the antenna switching capability based at least in part on the RO or the preamble associated with the PRACH.

Aspect 21: The method of Aspect 20, further comprising: transmitting, to the UE, the configuration that indicates the antenna switching point for msg3 of the four-step RACH procedure based at least in part on determining that the UE has the antenna switching capability.

Aspect 22: The method of any of Aspects 11-21, wherein the network node is an NTN node.

Aspect 23: An apparatus for wireless communication at a device, comprising a processor; memory coupled with the processor; and instructions stored in the memory and executable by the processor to cause the apparatus to perform the method of any of Aspects 1-10.

Aspect 24: A device for wireless communication, comprising a memory and one or more processors coupled to the memory, the memory and the one or more processors configured to perform the method of any of Aspects 1-10.

Aspect 25: An apparatus for wireless communication, comprising at least one means for performing the method of any of Aspects 1-10.

Aspect 26: A non-transitory computer-readable medium storing code for wireless communication, the code comprising instructions executable by a processor to perform the method of any of Aspects 1-10.

Aspect 27: A non-transitory computer-readable medium storing a set of instructions for wireless communication, the set of instructions comprising one or more instructions that, when executed by one or more processors of a device, cause the device to perform the method of any of Aspects 1-10.

Aspect 28: An apparatus for wireless communication at a device, comprising a processor; memory coupled with the processor; and instructions stored in the memory and executable by the processor to cause the apparatus to perform the method of any of Aspects 11-22.

Aspect 29: A device for wireless communication, comprising a memory and one or more processors coupled to the memory, the memory and the one or more processors configured to perform the method of any of Aspects 11-22.

Aspect 30: An apparatus for wireless communication, comprising at least one means for performing the method of any of Aspects 11-22.

Aspect 31: A non-transitory computer-readable medium storing code for wireless communication, the code comprising instructions executable by a processor to perform the method of any of Aspects 11-22.

Aspect 32: A non-transitory computer-readable medium storing a set of instructions for wireless communication, the set of instructions comprising one or more instructions that, when executed by one or more processors of a device, cause the device to perform the method of any of Aspects 11-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving, from a non-terrestrial network (NTN) node, a demodulation reference signal (DMRS) bundling configuration associated with an uplink communication to the NTN node and configured for multiple repetitions, wherein the DMRS bundling configuration defines one or more DMRS bundles associated with the uplink communication;

determining a configuration that indicates an antenna switching point associated with the uplink communication, wherein the antenna switching point corresponds to a time to switch a first transmit antenna to a second transmit antenna to transmit the uplink communication to the NTN node, and wherein the antenna switching point is based at least in part on a boundary of a DMRS bundle of the one or more DMRS bundles;

transmitting, to the NTN node, one or more repetitions of the uplink communication using the first transmit antenna prior to the antenna switching point; and transmitting, to the NTN node, one or more repetitions of the uplink communication using the second transmit antenna after the antenna switching point.

2. The method of claim 1, further comprising:

receiving the configuration that indicates the antenna switching point in a random access response (RAR) message associated with a random access channel procedure, wherein the uplink communication associated with the antenna switching point is a msg3 communication transmitted after receiving the RAR message.

3. The method of claim 1, further comprising:

receiving the configuration that indicates the antenna switching point in a system information block.

4. The method of claim 1, wherein the configuration is specified in a wireless communication standard.

5. The method of claim 1, further comprising:

receiving the configuration that indicates the antenna switching point in a radio resource control message, a medium access control control element, or downlink control information based at least in part on the uplink communication including a physical uplink shared channel or a physical uplink control channel.

6. The method of claim 1, wherein the configuration indicates that the antenna switching point is at a midpoint of the multiple repetitions that is defined using a floor or ceiling function according to a number of the multiple repetitions.

7. The method of claim 1, further comprising:

receiving, from the NTN node, random access configuration information that partitions random access channel (RACH) occasions (ROs) or preambles into a first subset for UEs having an antenna switching capability and a second subset for UEs lacking the antenna switching capability;

selecting an RO or a preamble in the first subset based at least in part on the UE having the antenna switching capability; and transmitting, to the NTN node, a physical RACH (PRACH) using the RO or the preamble selected from the first subset to initiate a four-step RACH procedure.

8. The method of claim 7, further comprising:

receiving, from the NTN node, the configuration that indicates the antenna switching point for msg3 of the four-step RACH procedure based at least in part on transmitting the PRACH using the RO or the preamble selected from the first subset for UEs having the antenna switching capability.

9. The method of claim 1, wherein one or more repetitions of the uplink communication transmitted prior to the antenna switching point are associated with a first DMRS bundle, and wherein one or more repetitions of the uplink communication transmitted after the antenna switching point are associated with a second DMRS bundle.

10. A method of wireless communication performed by a non-terrestrial network node, comprising:

transmitting, to a user equipment (UE), a demodulation reference signal (DMRS) bundling configuration associated with an uplink communication to the NTN node and configured for multiple repetitions, wherein the DMRS bundling configuration defines one or more DMRS bundles associated with the uplink communication;

determining a configuration that indicates an antenna switching point associated with the uplink communication, wherein the antenna switching point corresponds to a time for the UE to switch a transmit antenna to receive the uplink communication from the UE, wherein the antenna switching point is based at least in part on a boundary of a DMRS bundle of the one or more DMRS bundles;

receiving, from the UE, one or more repetitions of the uplink communication prior to the antenna switching point and one or more repetitions of the uplink communication after the antenna switching point; and performing channel estimation for the uplink communication based at least in part on the configuration that indicates the antenna switching point.

11. The method of claim 10, wherein performing the channel estimation includes:

attempting channel estimation according to a first assumption that the UE performed an antenna switch at the antenna switching point and according to a second assumption that the UE did not perform an antenna switch at the antenna switching point based at least in part on the uplink communication including a msg3 communication associated with a random access channel procedure.

12. The method of claim 11, further comprising:

decoding the msg3 communication based at least in part on a channel estimation result associated with the first assumption or the second assumption.

13. The method of claim 10, further comprising:

transmitting the configuration that indicates the antenna switching point in a random access response (RAR) message associated with a random access channel procedure, wherein the uplink communication associated with the antenna switching point is a msg3 communication subsequent to the RAR message.

14. The method of claim 10, further comprising:

transmitting the configuration that indicates the antenna switching point in a system information block.

15. The method of claim 10, wherein the configuration is specified in a wireless communication standard.

16. The method of claim 10, further comprising:

transmitting the configuration that indicates the antenna switching point in a radio resource control message, a medium access control control element, or downlink control information based at least in part on the uplink communication including a physical uplink shared channel or a physical uplink control channel.

17. The method of claim 10, wherein the configuration indicates that the antenna switching point is at a midpoint of the multiple repetitions that is defined using a floor or ceiling function according to a number of the multiple repetitions.

18. The method of claim 10, further comprising:

transmitting random access configuration information that partitions random access channel (RACH) occasions (ROs) or preambles into a first subset for UEs having an antenna switching capability and a second subset for UEs lacking the antenna switching capability;

receiving, from the UE, a physical RACH (PRACH) to initiate a four-step RACH procedure using an RO or a preamble selected from the first subset or the second subset; and determining whether the UE has the antenna switching capability based at least in part on the RO or the preamble associated with the PRACH.

19. The method of claim 18, further comprising:

transmitting, to the UE, the configuration that indicates the antenna switching point for msg3 of the four-step RACH procedure based at least in part on determining that the UE has the antenna switching capability.

20. A user equipment (UE) for wireless communication, comprising:

one or more memories; and one or more processors, based at least in part on information stored in the one or more memories, configured to:

receiving, from a non-terrestrial network (NTN) node, a demodulation reference signal (DMRS) bundling configuration associated with an uplink communication to the NTN node and configured for multiple repetitions, wherein the DMRS bundling configuration defines one or more DMRS bundles associated with the uplink communication;

determine a configuration that indicates an antenna switching point associated with the uplink communication, wherein the antenna switching point corresponds to a time to switch a first transmit antenna to a second transmit antenna to transmit the uplink communication to the NTN node, and wherein the antenna switching point is based at least in part on a boundary of a DMRS bundle of the one or more DMRS bundles;

transmit, to the NTN node, one or more repetitions of the uplink communication using the first transmit antenna prior to the antenna switching point; and transmit, to the NTN node, one or more repetitions of the uplink communication using the second transmit antenna after the antenna switching point.

21. The UE of claim 20, wherein the one or more processors are further configured to:

receive the configuration that indicates the antenna switching point in a random access response (RAR) message associated with a random access channel procedure, wherein the uplink communication associated with the antenna switching point is a msg3 communication transmitted after receiving the RAR message.

22. The UE of claim 20, wherein the one or more processors are further configured to:

receive the configuration that indicates the antenna switching point in a system information block.

23. The UE of claim 20, wherein the one or more processors are further configured to:

receive, from the NTN node, random access configuration information that partitions random access channel (RACH) occasions (ROs) or preambles into a first subset for UEs having an antenna switching capability and a second subset for UEs lacking the antenna switching capability;

select an RO or a preamble in the first subset based at least in part on the UE having the antenna switching capability; and transmit, to the NTN node, a physical RACH (PRACH) using the RO or the preamble selected from the first subset to initiate a four-step RACH procedure.

24. The UE of claim 20, wherein one or more repetitions of the uplink communication transmitted prior to the antenna switching point are associated with a first DMRS bundle, and wherein one or more repetitions of the uplink communication transmitted after the antenna switching point are associated with a second DMRS bundle.

25. A non-terrestrial network (NTN) node for wireless communication, comprising:

one or more memories; and one or more processors, based at least in part on information stored in the one or more memories, configured to:

transmit, to a user equipment (UE), a demodulation reference signal (DMRS) bundling configuration associated with an uplink communication to the NTN node and configured for multiple repetitions, wherein the DMRS bundling configuration defines one or more DMRS bundles associated with the uplink communication;

determine a configuration that indicates an antenna switching point associated with the uplink communication, wherein the antenna switching point corresponds to a time for the UE to switch a transmit antenna to receive the uplink communication from the UE, wherein the antenna switching point is based at least in part on a boundary of a DMRS bundle of the one or more DMRS bundles;

receive, from the UE, one or more repetitions of the uplink communication prior to the antenna switching point and one or more repetitions of the uplink communication after the antenna switching point; and perform channel estimation for the uplink communication based at least in part on the configuration that indicates the antenna switching point.

26. The NTN node of claim 25, wherein the one or more processors, to perform the channel estimation, are configured to:

attempt channel estimation according to a first assumption that the UE performed an antenna switch at the antenna switching point and according to a second assumption that the UE did not perform an antenna switch at the antenna switching point based at least in part on the uplink communication including a msg3 communication associated with a random access channel procedure.

27. The NTN node of claim 25, wherein the one or more processors are further configured to:

transmit the configuration that indicates the antenna switching point in a random access response (RAR) message associated with a random access channel procedure, wherein the uplink communication associated with the antenna switching point is a msg3 communication subsequent to the RAR message.

28. The NTN node of claim 25, wherein the one or more processors are further configured to:

transmit the configuration that indicates the antenna switching point in a system information block.

29. The network NTN node of claim 25, wherein the one or more processors are further configured to:

transmit random access configuration information that partitions random access channel (RACH) occasions (ROs) or preambles into a first subset for UEs having an antenna switching capability and a second subset for UEs lacking the antenna switching capability;

receive, from the UE, a physical RACH (PRACH) to initiate a four-step RACH procedure using an RO or a preamble selected from the first subset or the second subset; and determine whether the UE has the antenna switching capability based at least in part on the RO or the preamble associated with the PRACH.

30. The NTN of claim 25, wherein one or more repetitions of the uplink communication received prior to the antenna switching point are associated with a first DMRS bundle, and wherein one or more repetitions of the uplink communication received after the antenna switching point are associated with a second DMRS bundle.

* * * * *